United States Patent [19]
Taki et al.

[11] Patent Number: 5,862,317
[45] Date of Patent: Jan. 19, 1999

[54] COMMUNICATING APPARATUS WITH COMMUNICATION OBSTACLE MANAGEMENT

[75] Inventors: Hironobu Taki, Kawasaki; Yutaka Hiyama, Yokosuka, both of Japan

[73] Assignee: Canon, Tokyo, Japan

[21] Appl. No.: 938,777

[22] Filed: Sep. 26, 1997

Related U.S. Application Data

[63] Continuation of Ser. No. 291,180, Aug. 16, 1994, abandoned.

[30] Foreign Application Priority Data

Aug. 17, 1993 [JP] Japan .................................. 5-223873

[51] Int. Cl.$^6$ ..................................................... G06F 11/00
[52] U.S. Cl. ..................................................... 395/182.96
[58] Field of Search ....................... 395/182.16; 370/332, 370/216, 217, 218; 455/11.1, 54.1, 56.1; 379/26, 58, 59, 60, 212

[56] References Cited

U.S. PATENT DOCUMENTS

| | | | |
|---|---|---|---|
| 4,350,970 | 9/1982 | von Tomkewitsch | 340/23 |
| 4,570,227 | 2/1986 | Tachi et al. | 364/444 |
| 4,646,244 | 2/1987 | Bateman et al. | 364/461 |
| 4,736,453 | 4/1988 | Schloemer | 495/33 |
| 4,741,049 | 4/1988 | De Jager et al. | 455/32 |
| 4,907,290 | 3/1990 | Crompton | 455/56 |
| 5,214,789 | 5/1993 | George | 455/33.2 |
| 5,257,405 | 10/1993 | Reitberger | 455/54.1 |
| 5,259,017 | 11/1993 | Langmantel | 379/58 |
| 5,381,444 | 1/1995 | Tajima | 375/1 |
| 5,515,509 | 5/1996 | Rom | 395/200.1 |
| 5,517,677 | 5/1996 | Moon | 455/161.1 |
| 5,537,414 | 7/1996 | Takaiyasu et al. | 370/95.1 |

*Primary Examiner*—Robert W. Beausoliel, Jr.
*Assistant Examiner*—Stephen C. Elmore
*Attorney, Agent, or Firm*—Morgan & Finnegan LLP

[57] ABSTRACT

A communicating apparatus which stores communication obstacle information in the case where a communication obstacle occurs. The apparatus comprises a memory to store communication information and a managing unit to manage the information stored in the memory in accordance with information stored in a communication partner, wherein the managing unit processes the information stored in the memory in accordance with the recovery of the communication obstacle or the number of communication obstacles.

53 Claims, 28 Drawing Sheets

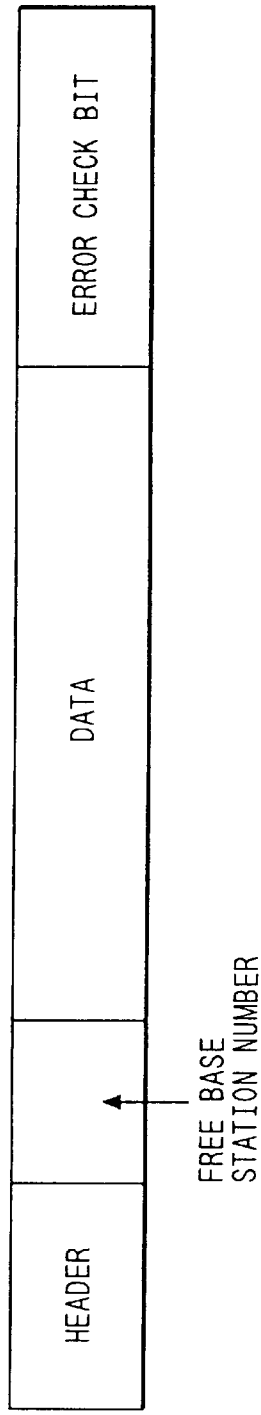

| STX | CLASSIFI-CATION | DATA | ETX | PARITY |

CLASSIFICATION: CONNECTION NOTIFICATION
FREE BASE STATION NUMBER
(FREE BASE STATION NUMBER IS ENTERED INTO DATA UNIT)
DISCONNECTION NOTIFICATION
DATA
THERE IS NO DATA UNIT FOR CONNECTION NOTIFICATION AND
DISCONNECTION NOTIFICATION

FIG. 29

| B7 | B6 | B5 | B4 | B3 | B2 | B1 | B0 |
|---|---|---|---|---|---|---|---|
| BASE STATION H | BASE STATION G | BASE STATION F | BASE STATION E | BASE STATION D | BASE STATION C | BASE STATION B | BASE STATION A |

IN CONNECTION : 1
FREE : 0

COMMUNICATING APPARATUS WITH COMMUNICATION OBSTACLE MANAGEMENT

This application is a continuation of Ser. No. 08/291,180 filed Aug. 16, 1994, now abandoned.

BACKGROUND OF THE INVENTION

1. Field of the Invention

The present invention relates to a communicating apparatus in which communication obstacle information is stored in the case where a communication obstacle occurs.

2. Related Background Art

Hitherto, an information processing equipment having a radio communicating function is used in a distribution industry or the like, thereby enabling works to be efficiently executed. As shown in FIG. 9, for example, in such a system, an information processing equipment A having a radio communicating function transmits and receives data to/from an information processing equipment B having a radio communicating function in a wireless manner.

In those information processing equipment, the base station side (information processing equipment A here) is constructed by a desk top type radio equipment, an information processing equipment, and the like as shown in FIG. 14. In many cases, the terminal station side (information processing equipment B here) has a portable structure of a light weight and a small size or an integrated type structure as shown in FIG. 8.

On the other hand, in the case where it is necessary to further efficiently execute radio data communication due to an increase in radio data communication amount or an enlargement of a range which needs the communication, as shown in FIG. 10, there is also a system such that one or more information processing equipment $B_1$ to $B_N$ each having a radio communicating function are connected to a base station A and the (1-to-N) data communication is executed.

An example of a style which is actually used will now be described. In case of managing the stocks of various kinds of articles in a warehouse of the distribution industry, a manager of the base station A requests a specific operator who carries the information processing equipment B having the radio communicating function and who exists in the warehouse to report a situation such as the number of stocks of the designated article or the like. On the other hand, the operator moves to the location of the designated article and confirms the number of stocks or the like and transmits data to the base station A.

There is a case where during the execution of the data transmission and reception between the information processing equipment B having the radio communicating function and the base station A, an obstacle such that the transmission and reception are suddenly stopped or the like occurs due to the movement of the information processing equipment B, a topographical reason of the transmitting location, or the like.

In this instance, in the information processing equipment B and the base station A, the obstacle information which is generated during the communication is recorded by a process prepared in an operating system (OS) as a fundamental software for control of each equipment or the application program.

Ordinarily, as for the communication obstacle information, in both of the information processing equipment B and the base station A, the time-elapsed changes of the operation, state, and operating situation of a computer (CPU) at that time point are held in a memory device and are used as information of the management and operation situations of a system constructed by those equipment.

In the above conventional apparatus, however, there is a limitation in the communication obstacle information which can be held because of a limitation of the memory size of the above information processing equipment.

As an application program to use the information processing equipment, a complicated program which can manage and process the communication obstacle information must be prepared.

In case of performing the data communication in a wireless manner between the host computer and the terminal, as shown in FIG. 17, there is also a system such that by connecting a plurality of base stations to the host computer, the host computer and the plurality of terminals can simultaneously communicate in a wireless manner. As a method of connecting them, the terminal transmits a connection request to an arbitrary base station and the base station responds to the connection request by a confirmation of the connection.

However, in the case where the terminal generated the connection request to an arbitrary base station so as to be connected to the host computer, when the base station is communicating with the other terminal, there is no response. In this case, the terminal times out and generates the connection request to another base station. Now, even if the connection succeeds, since the connection with the first base station has failed, there is a drawback such that it takes an additional time which is needed for connection by only the time which was required for the time-out. If the connection at the second and subsequent times also fails, it takes a further time.

SUMMARY OF THE INVENTION

It is an object of the invention to optimize the management of communication obstacle information.

Another object of the invention is to improve a use efficiency of a memory.

Still another object of the invention is to enable causes of a communication obstacle to be promptly examined.

Further another object of the invention is to enable processes after a communication obstacle was recovered to be promptly executed.

Further another object of the invention is to improve an examining precision of the causes of a communication obstacle.

Further another object of the invention is to realize a miniaturization and low Costs of a communicating apparatus.

Further another object of the invention is to enable a communication line to be promptly connected.

The above and other objects and features of the present invention will become apparent from the following detailed description and the appended claims with reference to the accompanying drawings.

BRIEF DESCRIPTION OF THE DRAWINGS

FIG. 19 is an explanatory diagram showing an example of a format of a communication packet between the terminal and the base station in the fifth embodiment;

FIG. 20 is an explanatory diagram showing an example of a free base station table in the fifth embodiment;

FIG. 29 is an explanatory diagram showing an example of a bit pattern of information indicating whether all of the base stations are being connected or they are free in the ninth embodiment of the invention;

DETAILED DESCRIPTION OF THE PREFERRED EMBODIMENTS

The first embodiment of the invention will be first described.

Figure 1:
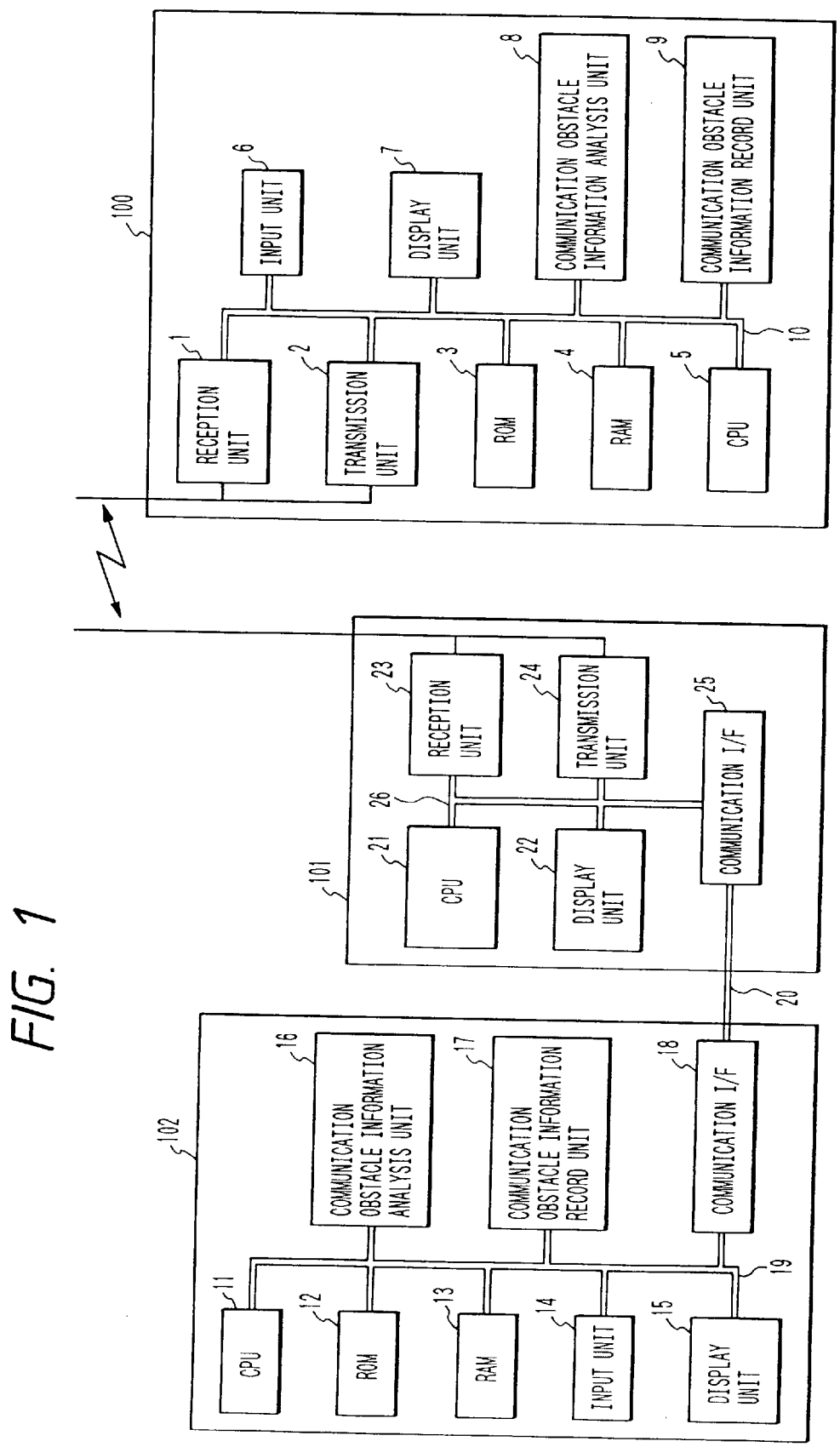
FIG. 1 is a block diagram showing a radio communication system according to the first embodiment of the invention.

FIG. 1 is a block diagram showing a construction of a radio communication system in the embodiment. The embodiment shows an example of the radio communication system comprises: an information processing equipment (terminal station) 100 having a small power radio communicating function; and a base station which is constructed by a small power radio transmission equipment 101 and an information processing equipment 102.

In FIG. 1, the information processing equipment 100 of the terminal station is constructed as an integrated structure having a small size and a light weight so as to be portable in the embodiment and has the following component elements 1 to 10.

A reception unit 1 receives data transmitted from the base station. A transmission unit 2 transmits the data to the base station. A control program which is necessary for the terminal station, data, and the like have been stored in an ROM 3. An RAM 4 is used as a memory area to store data which is used in the control program and a work area for information processes. A CPU 5 performs arithmetic operating processes for control and analysis.

An input unit 6 receive an input of data or command (processing command) from the operator of the information processing equipment 100 via a keyboard, a touch panel (touch key), or the like. A display unit 7 is constructed by an LCD, a CRT, or the like and displays characters, figure, image, or the like.

A communication obstacle information analysis unit 8 executes an analyzing process to analyze whether communication obstacle information which is generated during the communication with the base station and communication obstacle information managed in the base station are identical and accurate or not. A communication obstacle information record unit 9 manages the communication obstacle information generated during the communication with the base station and stores. A data bus 10 is used to transmit and receive data and a control signal to/from each of the above units.

The information processing equipment 102 of the base station has the following component elements 11 to 20.

A CPU 11 executes arithmetic operating processes for control and analysis. A control program which is necessary for the information processing equipment 102 of the base station, data, and the like have been stored in an ROM 12. An RAM 13 is used as a memory area to store data which is used for the control program and a work area for information processes.

An input unit 14 receives an input of data or command (processing command) by the operation of the operator of the information processing equipment 102 of the base station via a keyboard, a touch panel (touch key), or the like. A display unit 15 is constructed by an LCD, a CRT, or the like and displays characters, figure, image, or the like.

A communication obstacle information analysis unit 16 executes an analyzing process to analyze whether communication obstacle information which is generated during the communication with the information processing equipment 100 of the terminal station and communication obstacle information managed in the information processing equipment 100 of the terminal station are identical and accurate or not. A communication obstacle information record unit 17 manages the communication obstacle information generated during the communication with the information processing equipment 100 of the terminal station and stores.

A data bus 19 is used to transmit and receive data and a control signal to/from each of the above units. A communication interface 18 transmits and receives data and a control signal to/from a communication interface 25 of the radio transmission equipment 101 through a communication cable 20.

The small power radio transmission equipment 101 of the base station has the following component elements 21 to 26.

A CPU 21 executes arithmetic operating processes for control and analysis. A display unit 22 is constructed by an LED or the like and displays a situation of a power source, a communication, or the like. A reception unit 23 receives data transmitted from the information processing equipment 100 of the terminal station. A transmission unit 24 transmits the data to the information processing equipment 100 of the terminal station.

The communication interface 25 transmits and receives data and a control signal to/from the information processing equipment 102 of the base station. A data bus 26 is used for transmission and reception of data and a control signal to/from each of the above units.

Figure 2:
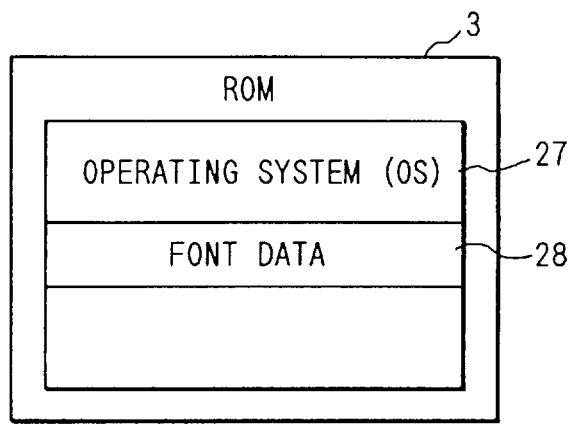
FIG. 2 is an explanatory diagram showing an example of an internal construction of an ROM of an information processing equipment in the first embodiment.

FIG. 2 is an explanatory diagram showing an example of an internal construction in the ROM 3 of the information processing equipment 100. In FIG. 2, an operating system (OS) as a fundamental software to control the information processing equipment has been stored in an area 27. A font data file as font information which is displayed by the display unit 7 has been stored in an area 28.

Figure 3:
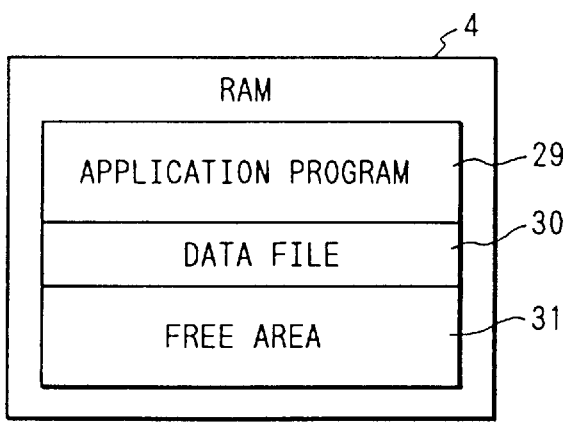
FIG. 3 is an explanatory diagram showing an example of an internal construction of an RAM of the information processing equipment in the first embodiment.

FIG. 3 is an explanatory diagram showing an example of an internal construction in the RAM 4 of the information processing equipment 100. In FIG. 3, an application program formed only for use in the information processing equipment 100 has been stored in an area 29. A data file which has been formed by an external apparatus such as a host computer or the like and transferred to the information processing equipment 100 or a data file which is formed by executing the application program has been stored in an area 30. An area 31 is a free area which is used as a work area for arithmetic operations at the time of processing of information.

Figure 4:
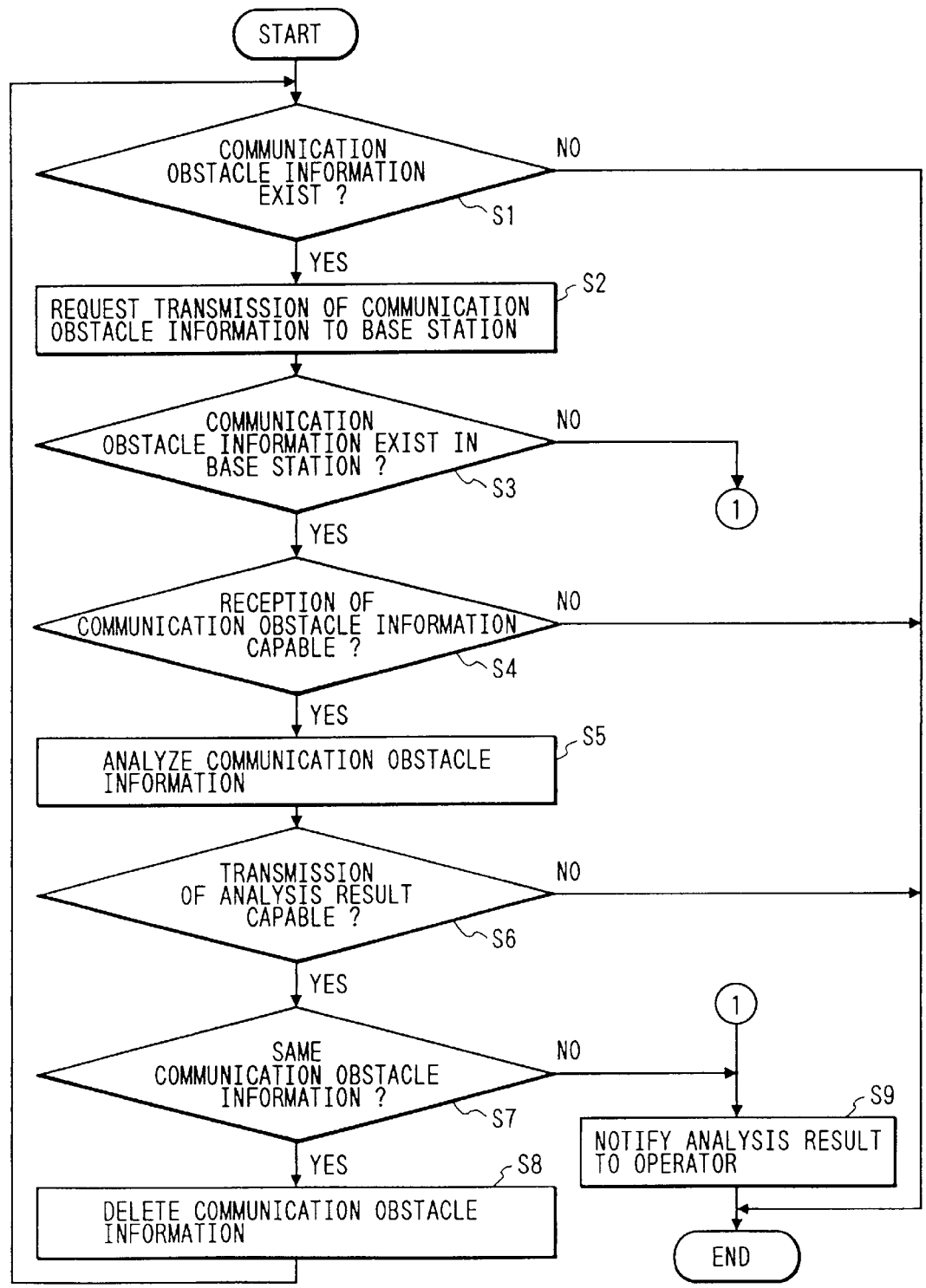
FIG. 4 is a flowchart showing an example of an analyzing process of communication obstacle information in the first embodiment.

FIG. 4 is a flowchart showing an example of an analyzing process of communication obstacle information in the information processing equipment 100 of the embodiment.

The analyzing process of the above communication obstacle information is executed by the operating system (OS) 27 as a fundamental software to control the information processing equipment 100 or the application program 29 formed only for use in the information processing equipment just after the recovery of the communication obstacle between the information processing equipment 100 (such that after the equipment 100 could not correctly receive data, it can again correctly receive the data) and the radio transmission equipment 100 of the base station.

First, in step S1, the presence or absence of the communication obstacle information managed in the communication obstacle information record unit 9 is examined by the operating system 27 or application program 29 of the information processing equipment 100. If such communication obstacle information exists, step S2 follows. If NO, the present processing routine is finished.

In step S2, a request is sent to the base station which has been communicating with the information processing equipment 100 so as to transmit the communication obstacle information managed by the base station to the information processing equipment 100. The processing routine advances to step S3.

Now, the base station which has been communicating with the information processing equipment 100 checks the presence or absence of the communication obstacle information managed in the communication obstacle information record unit 17 by the base station. In step S3, if the communication obstacle information exists by receiving the answer of the discriminating step, the processing routine advances to step S4. If NO, step S9 follows. A fact that no communication obstacle information exists in the base station is displayed by the display unit 7.

In step S4, the communication obstacle information which is managed by the base station is received. If it is normally received, step S5 follows. If there is an abnormality, the processing routine is finished.

In step S5, the communication obstacle information analysis unit 8 of the information processing equipment 100 analyzes the communication obstacle information managed by the communication obstacle information record unit 9 of the information processing equipment 100 and the communication obstacle information (date and time of the occurrence of the obstacle, current supplying time of the equipment, etc.) of the base station which received. The processing routine advances to step S6.

In the analysis in step S5, in order to examine whether the communication obstacle information managed in the information processing equipment 100 and the base station are identical and accurate or not, processes such as comparison, collation, and the like with respect to the necessary information items of the communication obstacle information are executed. The communication obstacle information is updated or added every communication obstacle information in accordance with the result of the analysis.

When formats (recording methods, styles, constructions of the information) or the like of the communication obstacle of the information processing equipment 100 and the base station differ, correcting processes such as data conversion and the like are also executed with respect to the information items which are necessary for the comparison, collation, and the like. The information can be used among a plurality of information processing equipment or between different kinds of information processing equipment by correcting or adding the analysis processing section.

The result analyzed in step S5 is transmitted to the radio transmission equipment 101 of the base station. If the transmission is normal in step S6, step S7 follows. If there is an abnormality, the processing routine is finished.

In step S7, a check is made to see if obstacle information managed by the information processing equipment 100 and 102 are identical or accurate on the assumption that an obstacle occurred during the communication on the basis of the analysis result analyzed in step S5. If they are identical and accurate, step S8 follows. If there is an abnormality in the analysis result, step S9 follows.

When the communication obstacle information managed by the information processing equipment 100 and 102 and the communication obstacle information managed by the base station are confirmed to be identical and accurate in step S7, the communication obstacle information is deleted from the communication obstacle information record unit 9 of the information processing equipment 100. In order to examine the next communication obstacle information, the processing routine advances to step S1.

Figure 11:
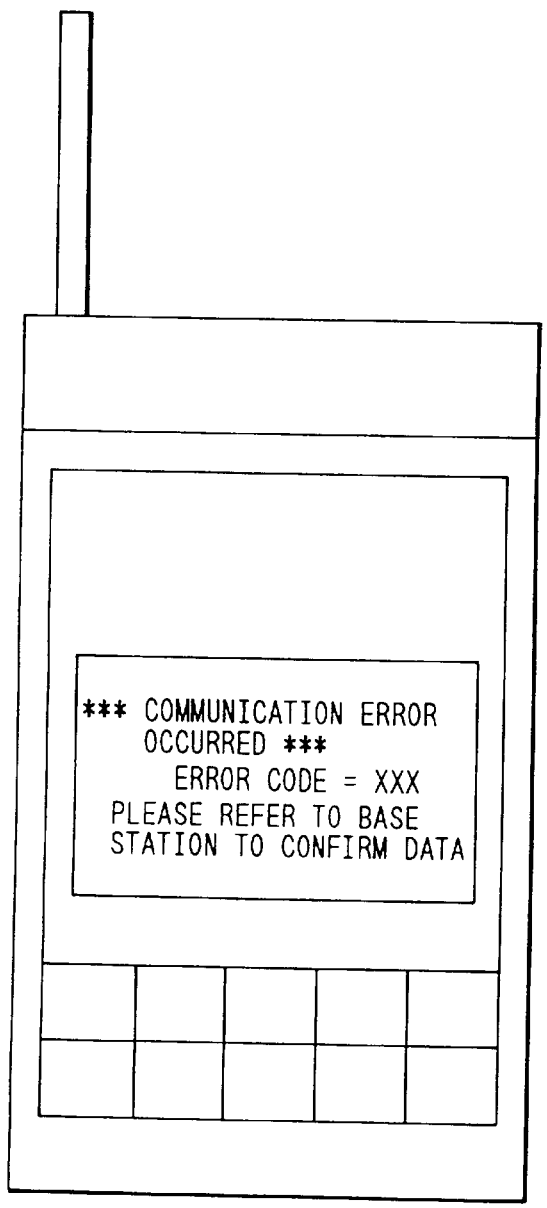
FIG. 11 is a front view showing an example of a notifying process in an information processing equipment having a small power radio communicating function.

In step S9, on the basis of the analysis result analyzed in step S5, the type of abnormality which occurred is displayed by the display unit 7 as shown in FIG. 11 in accordance with the obstacle information received from the base station and a notifying process to notify the type of abnormality to the operator of the information processing equipment 100 is executed. The processing routine is finished.

Figure 5:
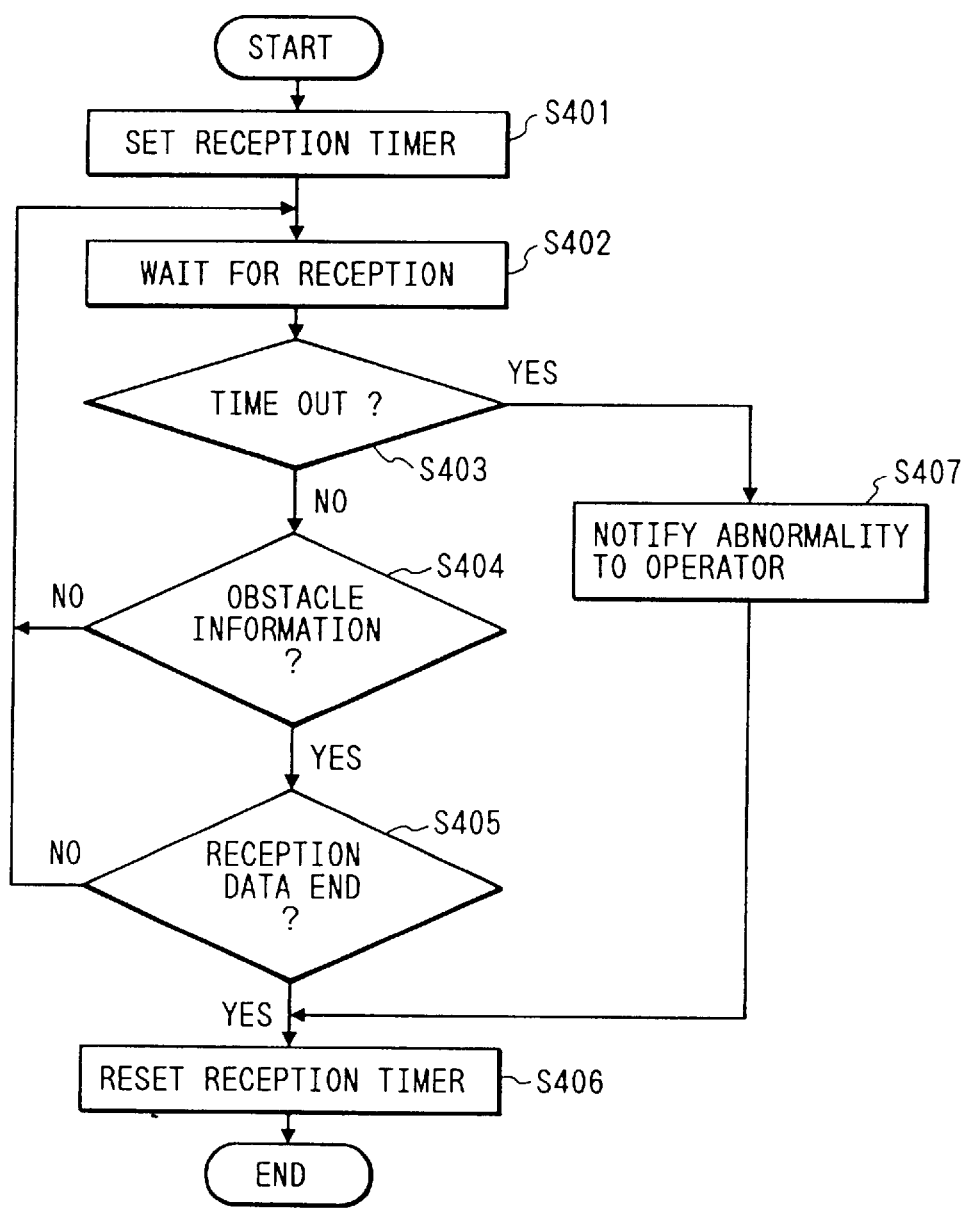
FIG. 5 is a flowchart showing an example of a reception judging process of communication obstacle information from a base station in FIG. 4.

FIG. 5 is a flowchart showing an example of the process in step S4 in FIG. 4.

First, in step S401, the reception unit 1 of the information processing equipment 100 is set into a receiving mode and a reception monitor timer is activated. Step S402 follows. The reception monitor timer is activated in order to examine whether the communication obstacle information can be received from the radio transmission equipment 101 of the base station within a set time or not.

In step S402, the apparatus waits for the reception of the communication obstacle information from the radio transmission equipment 101 of the base station.

In step S403, a check is made to see if the set time of the reception timer which was activated in step S401 has timed out or not. If NO, step S404 follows. If YES, step S407 follows.

In step S404, a check is made to see if the received data is the communication obstacle information from the radio transmission equipment 101 of the base station or not. If YES, step S405 follows. If NO, step S402 follows.

In step S405, a check is made to see if all of the communication obstacle information from the radio transmission equipment 101 of the base station which was received could be received or not. If YES, step S406 follows. If NO, step S402 follows.

In step S406, the reception timer is reset and the processing routine is finished. In step S407, processes such that a fact that the communication obstacle information from the radio transmission equipment 101 of the base station could not be received within the time which was set in the reception timer is displayed by the display unit 7 as shown in FIG. it is notified to the operator of the information processing equipment are executed. The processing routine is finished.

Figure 6:
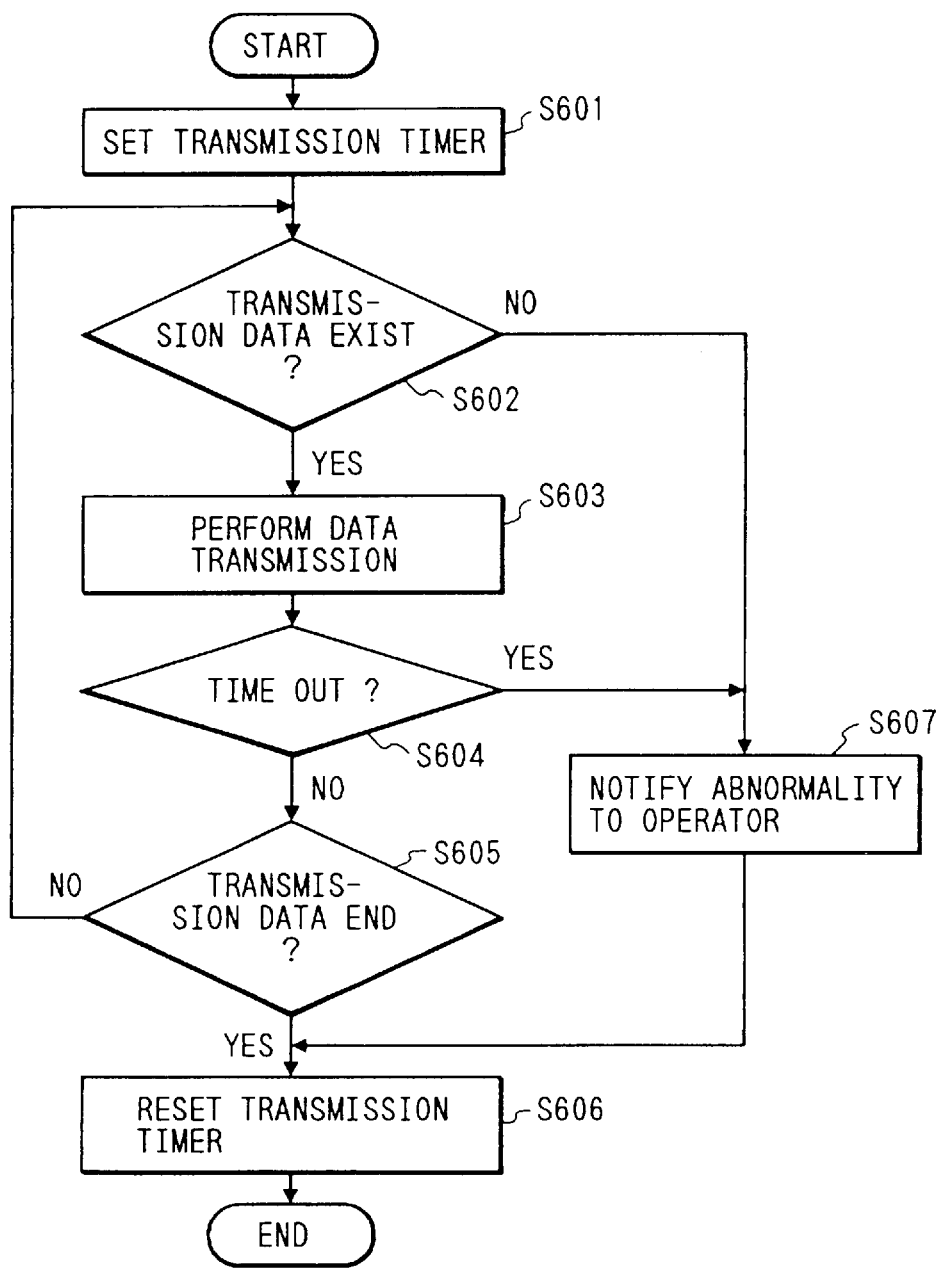
FIG. 6 is a flowchart showing an example of a transmission judging process of an analysis result to the base station in FIG. 4.

FIG. 6 is a flowchart showing an example of the process in step S6 in FIG. 4.

First, in step S601, the transmission unit 2 of the information processing equipment 100 is set into a transmitting mode and a transmission monitor timer is activated and step S602 follows. The transmission timer is activated in order to examine whether the communication obstacle information could be transmitted to the radio transmission equipment 101 of the base station within the set time or not.

In step S602, the presence or absence of the communication obstacle information managed in the communication obstacle information record unit 9 is examined by the operating system 27 or application program of the information processing equipment 100. If YES, step S603 follows. If NO, step S607 follows.

In step S603, the communication obstacle information managed by the information processing equipment 100 is transmitted to the radio transmission equipment 101 of the base station. In step S604, a check is made to see if the communication obstacle information from the information processing equipment 100 has been transmitted within the set time of the transmission timer which was activated in step S602 or not. If YES, step S604 follows. If NO, step S607 follows.

In step S605, a check is made to see if the whole communication obstacle information from the information processing equipment 100 could be transmitted or not. If YES, step S606 follows. If NO, step S602 follows.

Figure 12:
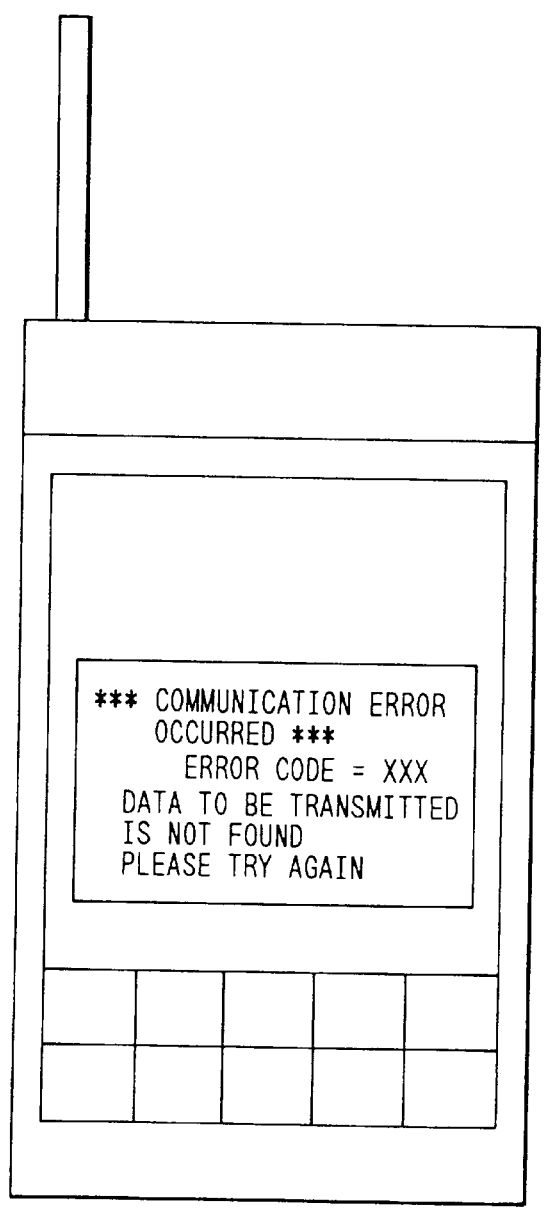
FIG. 12 is a front view showing another example of a notifying process in the information processing equipment having the small power radio communicating function.
Figure 13:
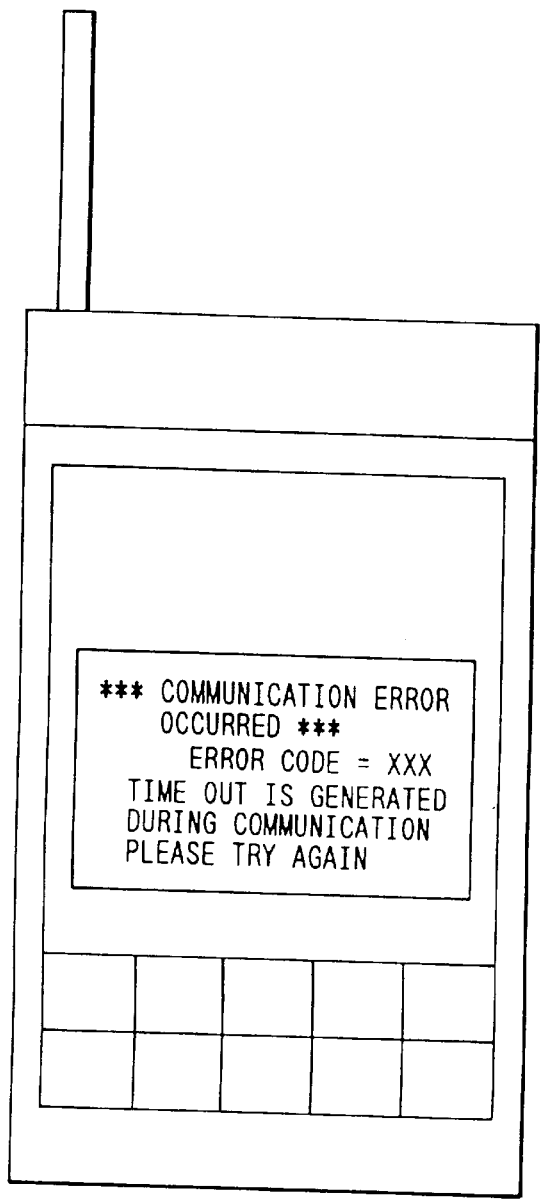
FIG. 13 is a front view showing further another example of the notifying process in the information processing equipment having the small power radio communicating function.
Figure 14:
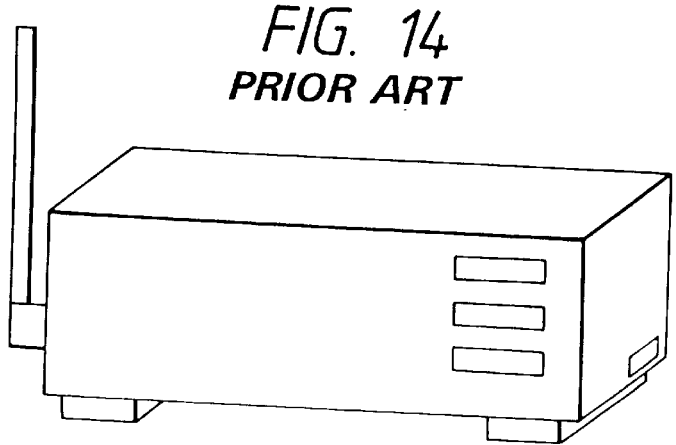
FIG. 14 is a perspective view showing a prior art example of an external view of a base station.

In step S606, the transmission timer is reset and the processing routine is finished. In step S607, processes such that a fact that the communication obstacle information to the radio transmission equipment 101 of the base station could not be transmitted is displayed by the display unit 7 as shown in FIG. 12 or 13 and it is notified to the operator of the information processing equipment 100 are executed. The processing routine is finished.

As mentioned above, according to the first embodiment, in the information processing equipment 100 having the small power radio communicating function, by managing the communication obstacle information which is generated during the communication with the base station and by receiving the communication obstacle information which is managed in the base station and by executing the analyzing process of the communication obstacle information, in the case where it is confirmed that the same communication obstacle information has been managed in the base station, there is no need to manage and hold the unnecessary communication obstacle information on the side of the information processing equipment 100. There is an effect such that a memory use efficiency is improved.

At the time of the development of the application program using the information processing equipment, a load to form a program to manage the communication obstacle information is eliminated and a development efficiency is improved.

The invention is not limited to the radio transmitting equipment but can be also applied to any other apparatus which performs a communication through a metal wire or an optical fiber.

The second embodiment of the invention will now be described.

Since the second embodiment has contents similar to those described in FIGS. 1 to 3 and 11 to 13 mentioned above, their detailed descriptions are omitted here and only characteristic points of the second embodiment will now be described.

Figure 7:
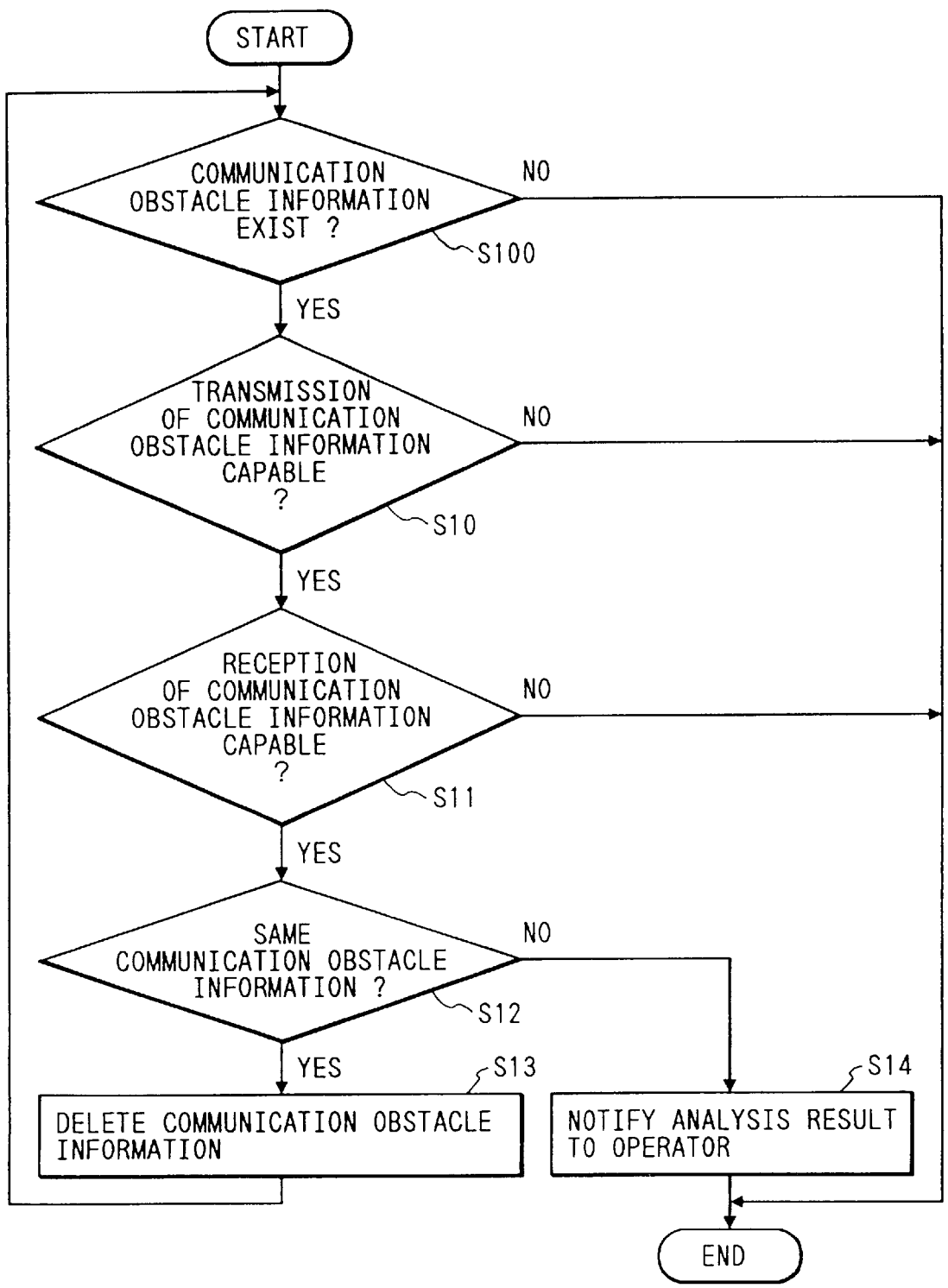
FIG. 7 is a flowchart showing an example of processes according to the second embodiment of the invention.
Figure 8:
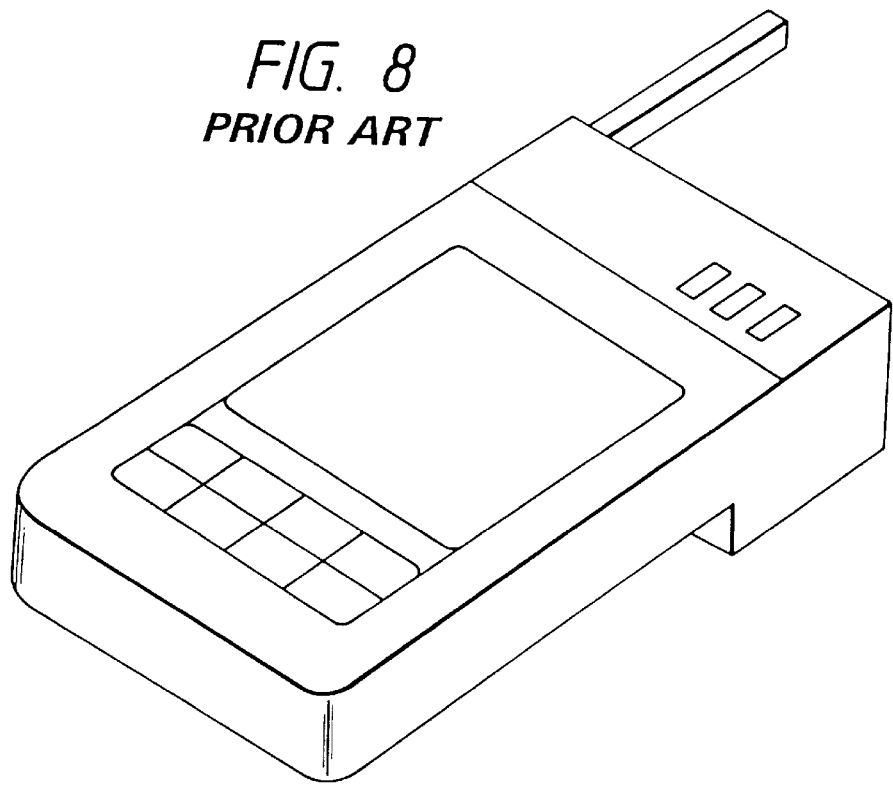
FIG. 8 is a perspective view showing an example of an external view of a prior art an information processing apparatus having a radio communicating function.
Figure 9:
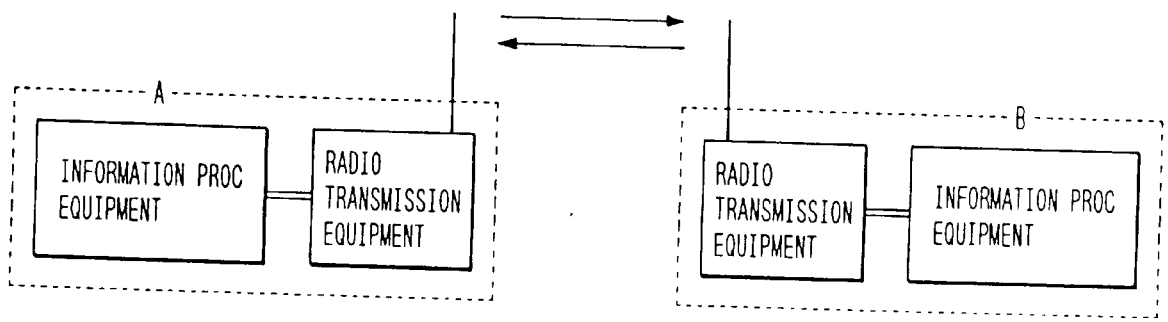
FIG. 9 is a block diagram showing an example of a prior art radio communication system between an information processing equipment having a radio communicating function and a base station.
Figure 10:
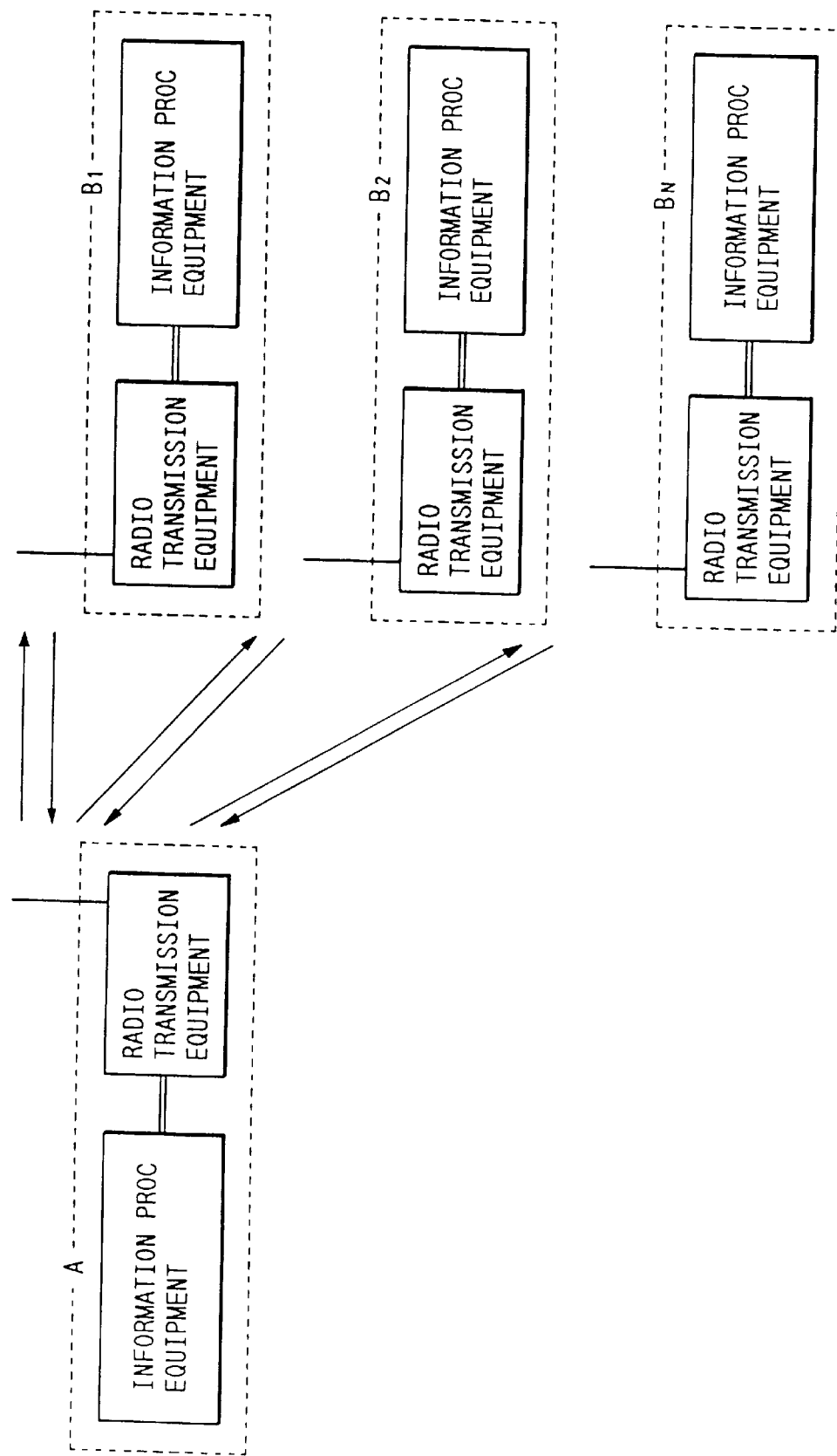
FIG. 10 is a block diagram showing an example of a prior art radio communication system between a plurality of information processing equipment having the radio communicating function and a base station.

FIG. 7 is a flowchart showing an example of the processes in the information processing equipment 100 of the second embodiment.

The processing routine is executed by the operating system (OS) 27 as a fundamental software to control the information processing equipment 100 or the application program 29 formed only for use in the information processing equipment 100 just after the recovery of the communication obstacle between the information processing equipment 100 and the base station.

First, in step S100, the presence or absence of the communication obstacle information managed in the communication information obstacle record unit 9 is examined by the operating system 27 or the application program 29 of the information processing equipment 100. If YES, step S10 follows. If NO, the processing routine is finished.

In step S10, the communication obstacle information which is managed by the information processing equipment 100 is transmitted to the radio transmission equipment 101 of the base station. If the transmission has normally been finished, step S11 follows. If there is an abnormality, the processing routine is finished.

On the other hand, in the base station, the communication obstacle information analysis unit 16 analyzes the communication obstacle information of the information processing equipment 100 and the communication obstacle information (date and time of the occurrence of the obstacle, communication time of the equipment, etc.) which is managed in the communication obstacle information record unit 17 by the base station. In step S11, the information processing equipment 100 receives the analysis result from the radio transmission equipment 101 of the base station.

If the communication obstacle information has normally been received, step S12 follows. If there is an abnormality, the processing routine is finished. In the analysis here, in order to examine whether the communication obstacle information managed in the information processing equipment 100 and the base station are identical and accurate or not, processes such as comparison, collation, and the like with respect to the necessary information items of the obstacle information are executed. The analysis result information is updated or added every communication obstacle information.

In the case where the communication obstacle information formats (recording methods, styles, and constructions of information) or the like of the information processing equipment 100 and the base station differ, correcting processes such as data conversion and the like are also executed with respect to the information items which are necessary for the processes such as comparison, collation, and the like. Due to this, the information can be used among a plurality of information processing equipment or among different kinds of information processing equipment by correcting or adding the analysis processing portion.

In step S12, on the basis of the analysis result received in step S11, a check is made to see if the obstacle information managed in the information processing equipment 100 and 102 is identical and accurate or not on the assumption that the obstacle occurred during the communication. If YES, step S13 follows. If there is an abnormality in the analysis result, step S14 follows.

In step S13, the communication obstacle information of the base station is deleted from the communication obstacle information record unit 9 of the information processing equipment 100 because it has been confirmed that the communication obstacle information which is managed by the base station is identical and accurate as a result of the analysis about the obstacle information which was transmitted to the base station in step S10. To examine the next communication obstacle information, the processing routine advances to step S100.

In step S14, on the basis of the analysis result received in step S11, there are executed notifying processes such that a difference which occurs between the communication obstacle information transmitted from the information processing equipment 100 and the communication obstacle information managed in the information processing equipment 102 is displayed by the display unit 7 as shown in FIG. 11 and it is notified to the operator of the information processing equipment 100. The processing routine is finished.

According to the second embodiment as mentioned above, in the information processing equipment 100 having the small power radio communicating function, by transmitting the communication obstacle information which is generated during the communication with the base station and by executing the analyzing process of the communication obstacle information on the base station, if it is confirmed that the same communication obstacle information has been managed in the base station, the information processing equipment 100 doesn't need to manage and hold the unnecessary communication obstacle information and there is an effect such that a memory use efficiency is improved or the like. When an application program to use the information processing equipment 100 is developed, a load to form a program to manage the communication obstacle information is eliminated and a development efficiency is improved.

The third embodiment of the invention will now be described.

Since the third embodiment has contents similar to those described in FIGS. 1 to 3 and 11 to 13 mentioned above, their descriptions are omitted here and only characteristic points of the third embodiment will be described.

According to the embodiment, communication obstacles between the information processing equipment 100 and the base station are managed in the communication obstacle information record unit 9 by the operating system 27 as a fundamental software to control the information processing equipment or the application program 29 formed only for use in the information processing equipment. When the number of communication obstacles reaches the critical number of obstacles which can be managed, the embodiment is executed.

Figure 15:
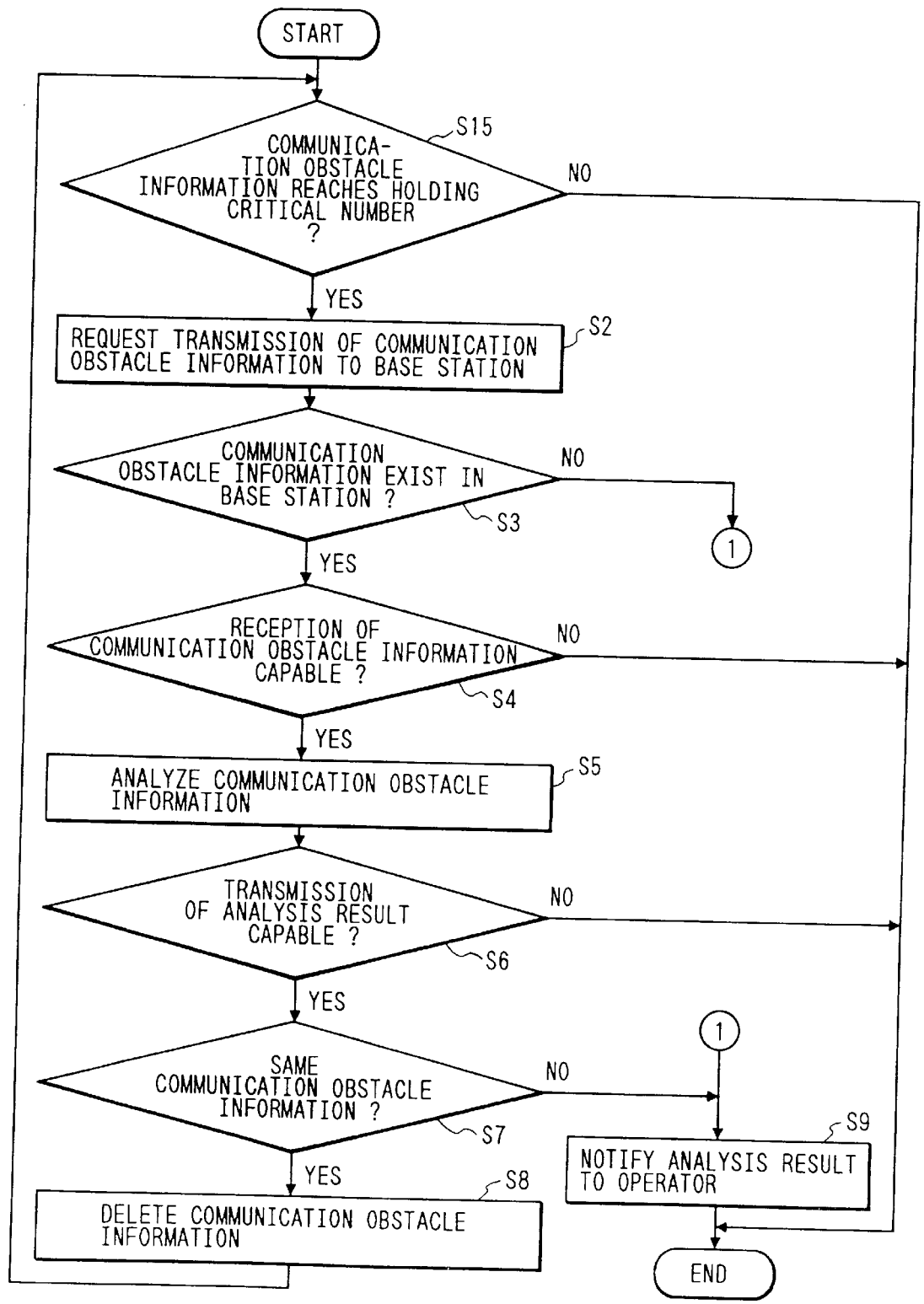
FIG. 15 is a flowchart showing an example of processes in an information processing equipment having a radio communicating function of the third embodiment of the invention.

FIG. 15 is a flowchart showing an example of processes in the information processing equipment 100 having the radio communicating function according to the third embodiment.

Since the flowchart is similar to the flowchart shown in FIG. 4 except that step S1 in FIG. 4 is replaced to step S15, a process in step S15 will now be described.

In step S15, the presence or absence of the communication obstacle information managed in the communication obstacle information record unit 9 are discriminated and the present holding number of the communication obstacle information is examined by the operating system 27 or the application program 29 of the information processing equipment 100. If the communication obstacle information of the number as many as the holding number which has been set in the operating system 27 or the application program 29 exist in the information processing equipment 100, the processing routine advances to step S2. If NO, the processing routine is finished.

The processes in steps S2 to S9 in the flowchart of FIG. 15 are similar to those shown in FIG. 4. The details of the processes in steps S4 and S6 in FIG. 15 are similar to those shown in FIGS. 5 and 6.

According to the third embodiment as mentioned above, in the information processing equipment 100 having the radio communicating function, the communication obstacle information which is generated during the communication with the base station is managed in the communication obstacle information record unit 9 by the operating system 27 as a software to control the information processing equipment 100 or the application program 29 formed only for use in the information processing equipment 100 and in the case where the communication obstacle frequently occurs, if the number of obstacles reaches the holding critical number, the communication obstacle information managed in the communication obstacle information record unit 17 of the base station is received and the analyzing process of the communication obstacle information is executed. Consequently, in the case where it is confirmed that the same communication obstacle information has been managed in the base station, the information processing equipment 100 doesn't need to manage and hold the unnecessary communication obstacle information into the communication obstacle information record unit 9. There is an effect such that the memory use efficiency is improved.

At the time of the development of the application program using the information processing equipment 100, a load to form the program to manage the communication obstacle information is eliminated there is an effect such that a development efficiency is improved.

The fourth embodiment of the invention will now be described.

Since the fourth embodiment has contents similar to those described in FIGS. 1 to 3 and 11 to 13 mentioned above, their detailed descriptions are omitted here and only characteristic points of the fourth embodiment will now be described.

The above processes are executed in the case where the communication obstacles between the information processing equipment 100 and the base station are managed in the communication obstacle information record unit 9 by the operating system 27 as a fundamental software to control the information processing equipment 100 or the application program 29 formed only for use in the information processing equipment 100 and when the number of obstacles reaches the holding critical number.

Figure 16:
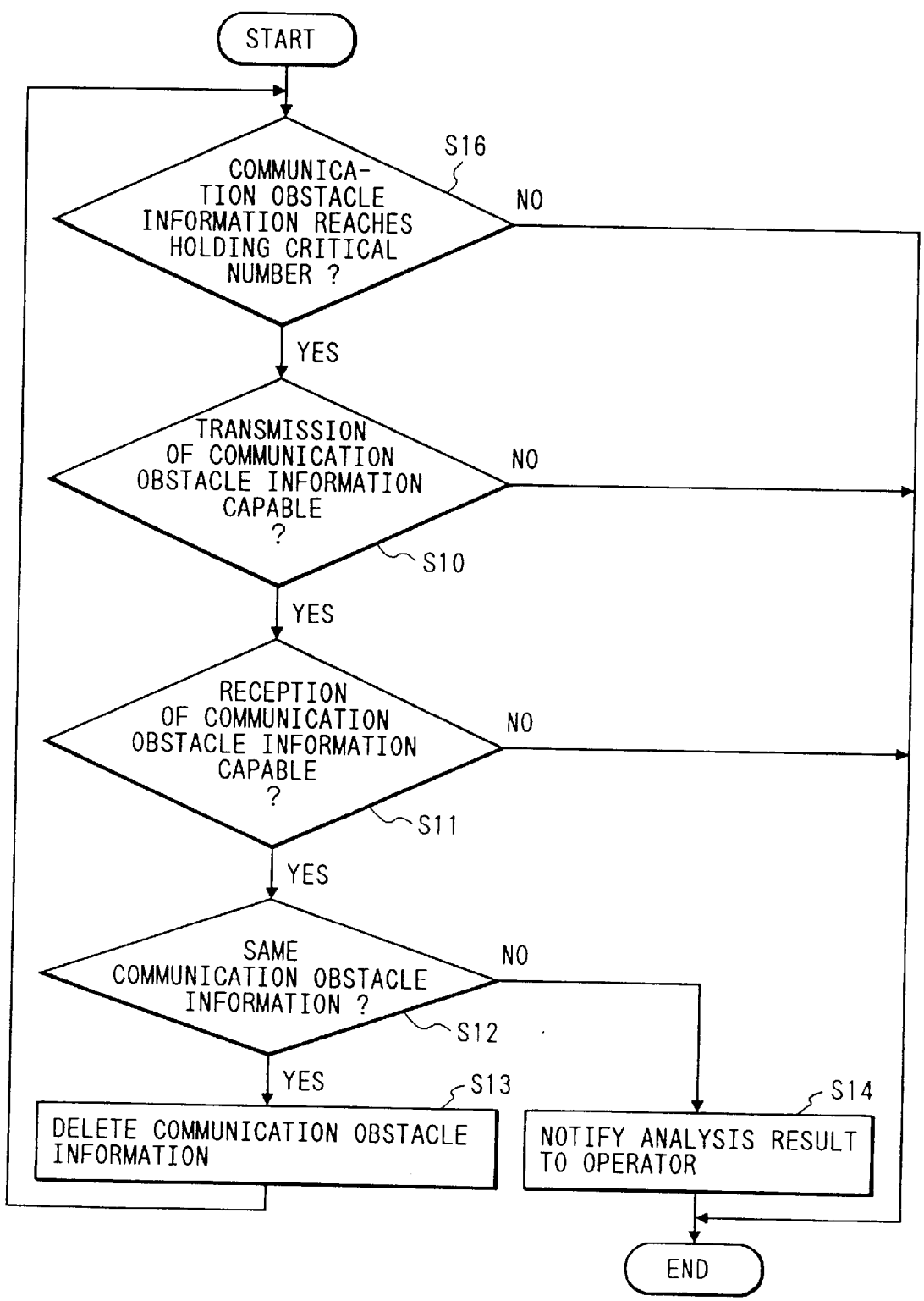
FIG. 16 is a flowchart showing an example of processes in an information processing apparatus having a radio communicating function of the fourth embodiment of the invention.
Figure 17:
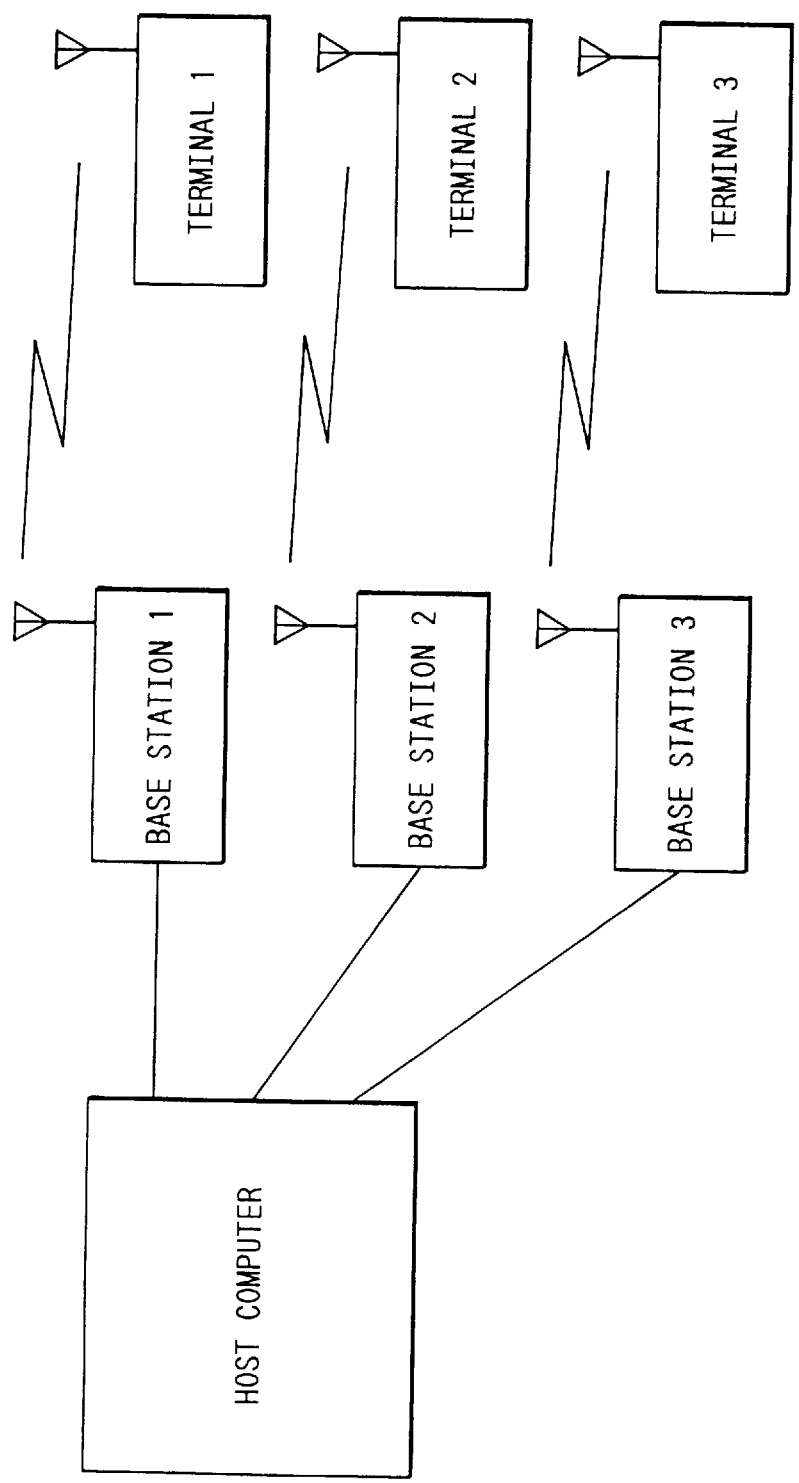
FIG. 17 is a block diagram showing a fundamental construction of a radio communication system in the fifth embodiment of the invention.

FIG. 16 is a flowchart showing an example of the processes in the information processing equipment 100 having the radio communicating function of the fourth embodiment.

Since the flowchart is similar to the flowchart of FIG. 7 except that step S100 in FIG. 7 is replaced to step S16, only the process in step S16 will now be described.

In step S16, the presence or absence of the communication obstacle information managed in the communication obstacle information record unit 9 is discriminated and the present holding number is examined by the operating system 27 or the application program 29 of the information processing equipment. If the number of communication obstacles detected in the information processing equipment 100 reaches the holding critical number which has been set in the operating system 27 or the application program 29, the processing routine advances to step S10. If NO, the processing routine is finished.

The processes in steps S10 to S14 in the flowchart of FIG. 16 are similar to those in FIG. 7.

According to the fourth embodiment as described above, in the information processing equipment 100 having the radio communicating function, the communication obstacle information which is generated during the communication with the base station is managed in the communication obstacle information record unit 9 by the operating system 27 as a fundamental software to control the information processing equipment 100 or the application program 29 formed only for use in the information processing equipment 100 and when the communication obstacle frequently occurs, if the number of communication obstacles reaches the holding critical number, the communication obstacle information is transmitted to the base station and the analyzing process of the communication obstacle information is executed. Consequently, in the case where it is confirmed that the same communication obstacle information has been managed in the base station, the information processing equipment 100 doesn't need to manage and hold the unnecessary communication obstacle information into the communication obstacle information record unit 9. There is an effect such that the memory use efficiency is improved.

The fifth embodiment of the invention will now be described.

In the fifth embodiment, information indicating whether the base station is in communication or not is stored into a packet to be transmitted by the base station. In the case where the terminal is connected to the host computer, the packet is received before a connection request is transmitted. The base station which is not in communication at present is examined. The connection request is transmitted to the base station. Due to this, a failure of the connection which occurs because the base stations is in communication is eliminated.

Figure 18:
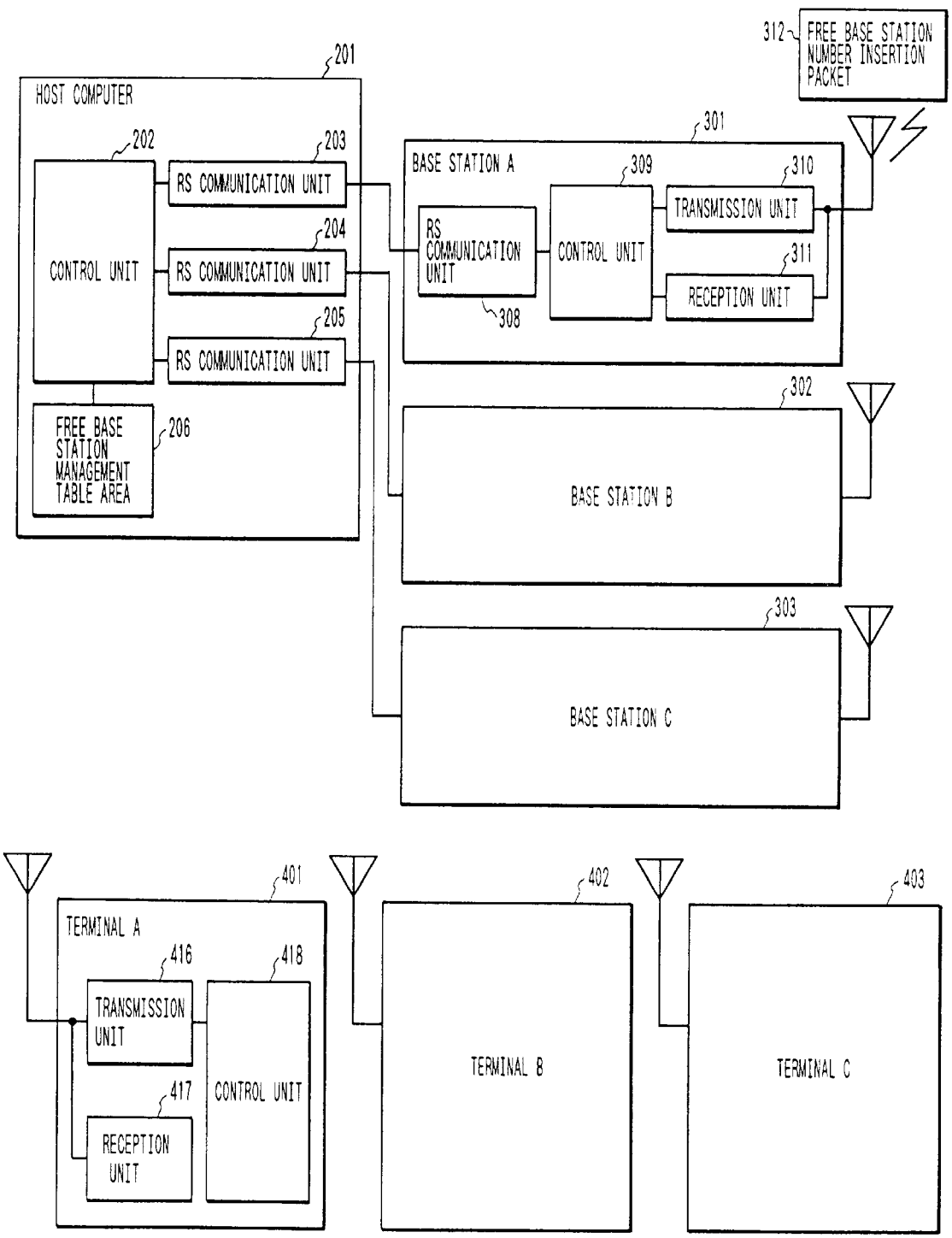
FIG. 18 is a block diagram showing a construction of each element in the fifth embodiment.

FIG. 18 is a block diagram showing a construction of the fifth embodiment. That is, a system of the fifth embodiment comprises a host computer 201, base stations 301 to 303, and terminals 401 to 403. FIG. 18 shows an internal construction of the host computer 201, base station 301, and terminal 401. Since the base stations 302 and 303 are similar to the base station 301 and the terminals 402 and 403 are similar to the terminal 401, their overlapped descriptions are omitted here.

The host computer 201 controls the base stations 301 to 303 and communicates with the terminals 401 to 403.

Figure 23:
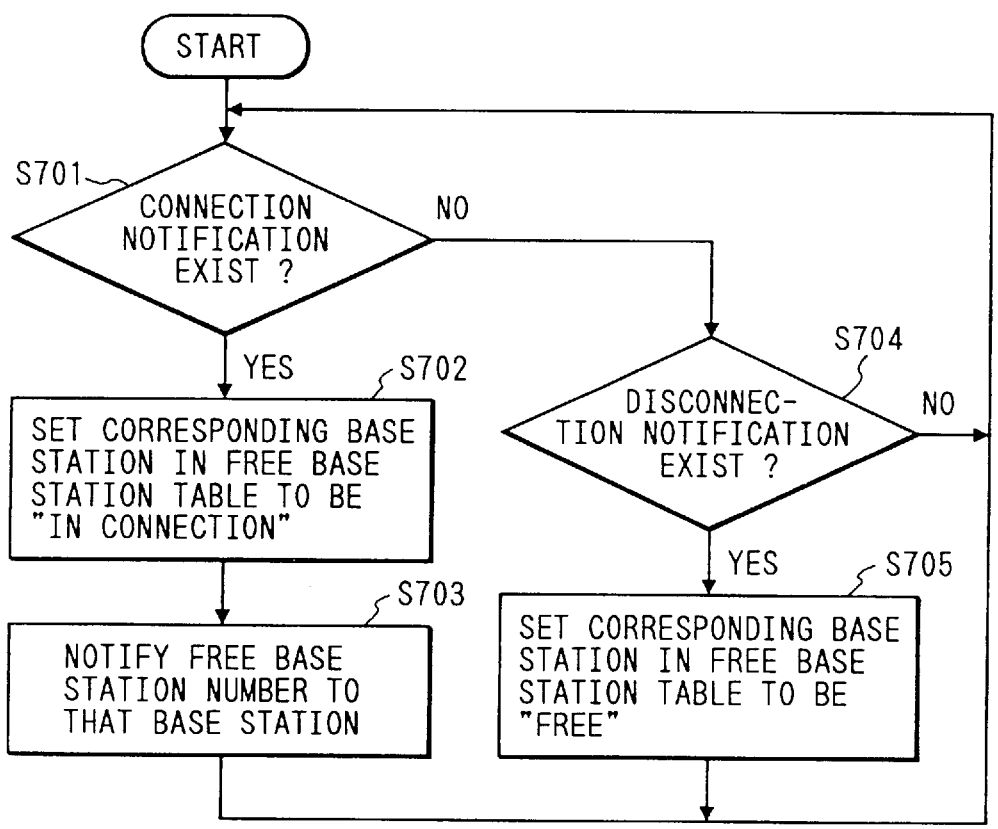
FIG. 23 is a flowchart showing an example of the operation of a host computer in the fifth embodiment.

A control unit 202 of the host computer 201 controls RS communication units 203 to 205 and executes processes in FIG. 23. The RS communication units 203 to 205 communicate with the base stations 301 to 303 by an RS (serial signal). A free base station management table area 206 is a memory area in which a free base station management table to manage which base stations are free has been stored.

An RS communication unit 308 of the base station 301 communicates with the host computer 201 by the RS. A control unit 309 controls the RS communication unit 208, a transmission unit 310, and a reception unit 311 and executes processes in FIG. 22.

The transmission unit 310 transmits data in a wireless manner. The reception unit 311 receives data in a wireless manner. A free base station number insertion packet 312 is a packet to be transmitted from the base station to the terminal.

Figure 21:
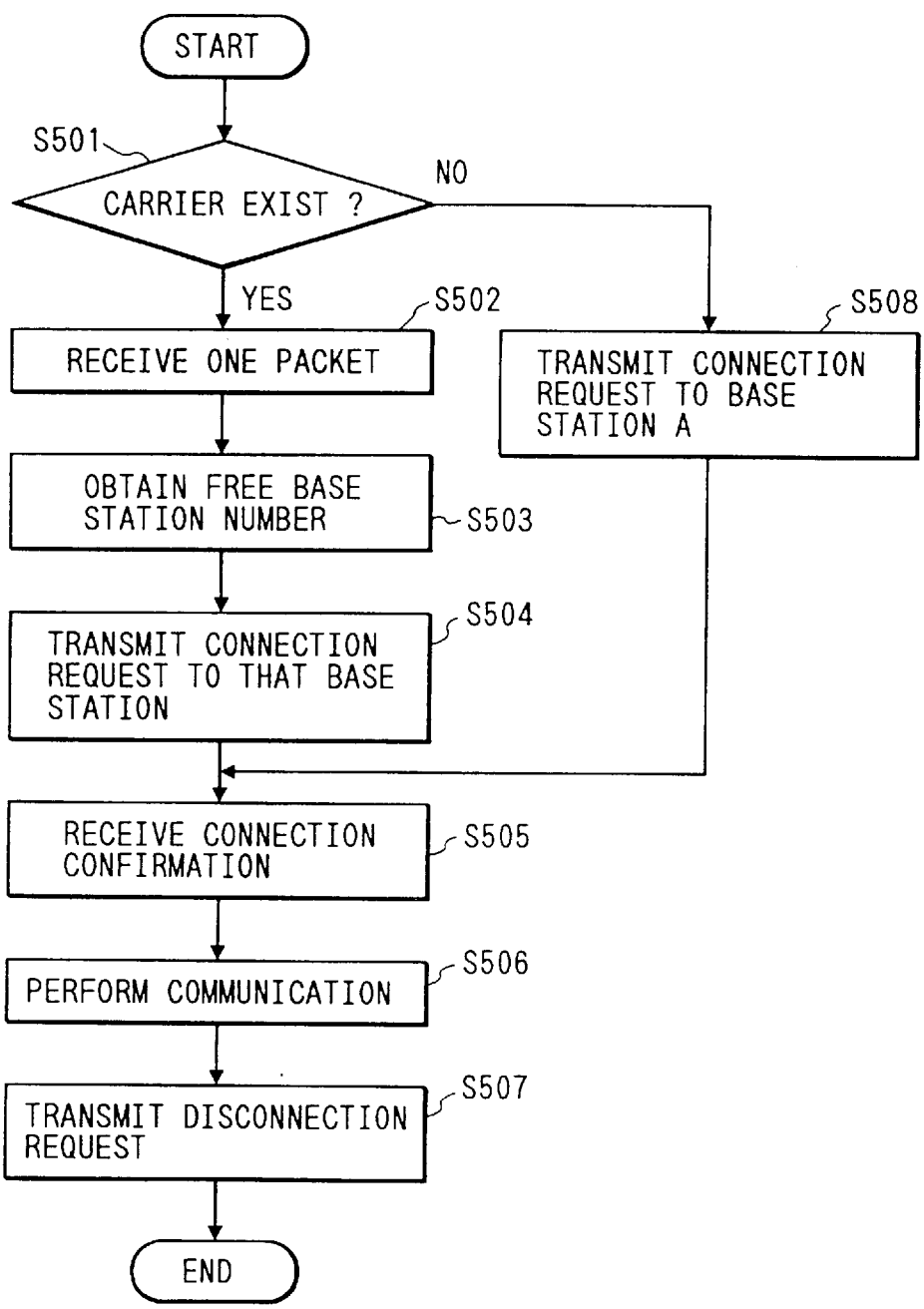
FIG. 21 is a flowchart showing an example of the operation of the terminal in the fifth embodiment.

The terminal 401 comprises: a transmission unit 416 to transmit data in a wireless manner; a reception unit 417 to receive data in a wireless manner; and a control unit 418 to execute processes in FIG. 21.

FIG. 19 is an explanatory diagram showing an example of a format of a communication packet between the terminal and the base station. In the communication packet, the number of the base station which is not in communication at present and which can accept a connection request from the terminal is inserted into the free base station number area.

Figure 22:
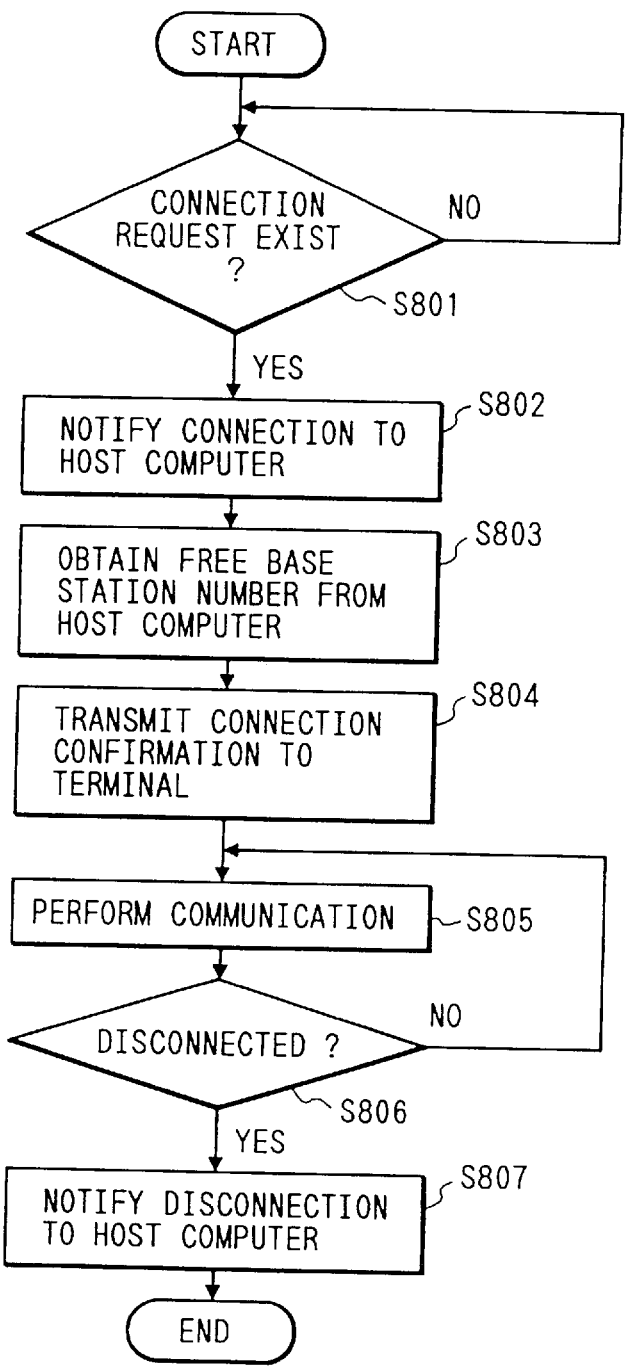
FIG. 22 is a flowchart showing an example of the operation of the base station in the fifth embodiment.

The operations of the terminal, base station, and host computer will now be described with reference to flowcharts of FIGS. 21 to 23.

The operation of the control unit of the terminals 401 to 403 will be described in FIG. 21. In step S501, a check is made to see if there is a carrier or not. The discrimination in step S501 corresponds to the examination to discriminate whether a radio wave is at present generated or not, namely, whether the other terminal is in communication or not.

If there is no carrier, this means that none of the base stations is in communication. Therefore, a connection request is transmitted to the base station 301 in step S508.

When there is a carrier, this means that a radio wave has been generated. Therefore, one packet is received in step S502. In step S503, the received packet is examined and the free base station number in FIG. 18 is obtained.

In step S504, the connection request is subsequently transmitted to the base station. After the connection request was transmitted in step S504 or S508, a connection acknowledgment which is sent from the base station is received and the connection is completed. In step S506, the communication is executed. After completion of the communication, a disconnection request is transmitted in step S507. The processing routine is finished.

The operation of the control unit of the base stations 301 to 303 will now be described with reference to FIG. 22. In step S801, a check is made to see if a connection request has been transmitted from the terminal or not. If NO, the apparatus waits until it is transmitted.

If YES, the connection is notified to the control unit 202 of the host computer 201 in step S802. Subsequently, the free base station number which is transmitted from the control unit 202 of the host computer 201 is received and obtained (S803). After that, the free base station number is inserted into the packet to be transmitted to the terminal.

In step S804, a connection acknowledgment is transmitted to the terminal. In step S805, the communication is executed. In step S806, a check is made to see if the terminal has been disconnected or not. If YES, the disconnection is notified to the control unit 202 of the host computer 201 in step S807.

During the communication, the data and the data acknowledgment are alternately transmitted and received between the terminal and the base station. The communication between the base station and the RS communication unit of the host computer is executed by a packet format shown in FIG. 24.

In FIG. 23, the operation of the control unit 202 of the host computer 201 will now be described. In step S701, a check is made to see if the connection notification has been transmitted from the base station or not. If YES, in step S702, the corresponding base station in the free base station table of FIG. 20 is set into the "in-connection". The present free base station number is notified to the base station and the processing routine is returned to step S701.

In step S701, when there is no connection notification, a check is made in step S704 to see if there is a disconnection notification or not. If YES, the corresponding base station in the free base station management table area 206 is set to be free (S705). The processing routine is returned to step S701.

The sixth embodiment of the invention will now be described.

In the sixth embodiment, in the case where there is no free base station in the above fifth embodiment, by inserting an operation to set the free base station number in FIG. 19 into "0", if no free base station exists, the connection request is not transmitted and the apparatus waits until any one of the base stations becomes free.

Figure 25:
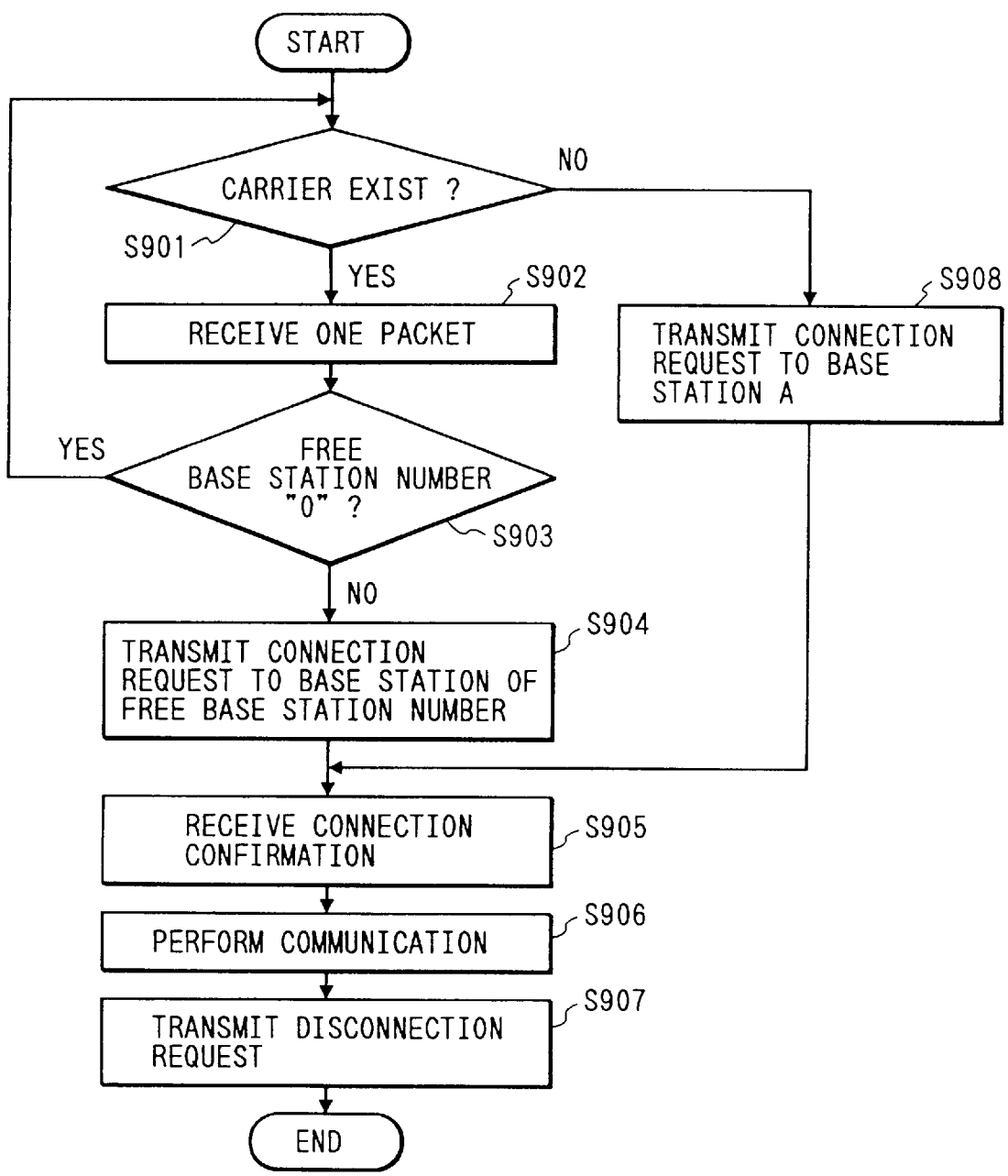
FIG. 25 is a flowchart showing an example of the operation of a terminal in the sixth embodiment of the invention.

Due to this, there is no need to transmit the vain connection request. FIG. 25 is a flowchart showing the operation in such a case. Only the portions different from FIG. 21 will be described.

First, after one packet was received in step S902, a check is made to see if the free base station number is equal to "0" or not in step S903. If NO, step S904 follows and the same operation as that described in the fifth embodiment is executed.

When the free base station number is equal to "0", the connection request is not transmitted but the processing routine is returned to step S901 and next one packet is received. In this manner, the apparatus waits until a free base station is obtained.

The seventh embodiment of the invention will now be described.

Figure 26:
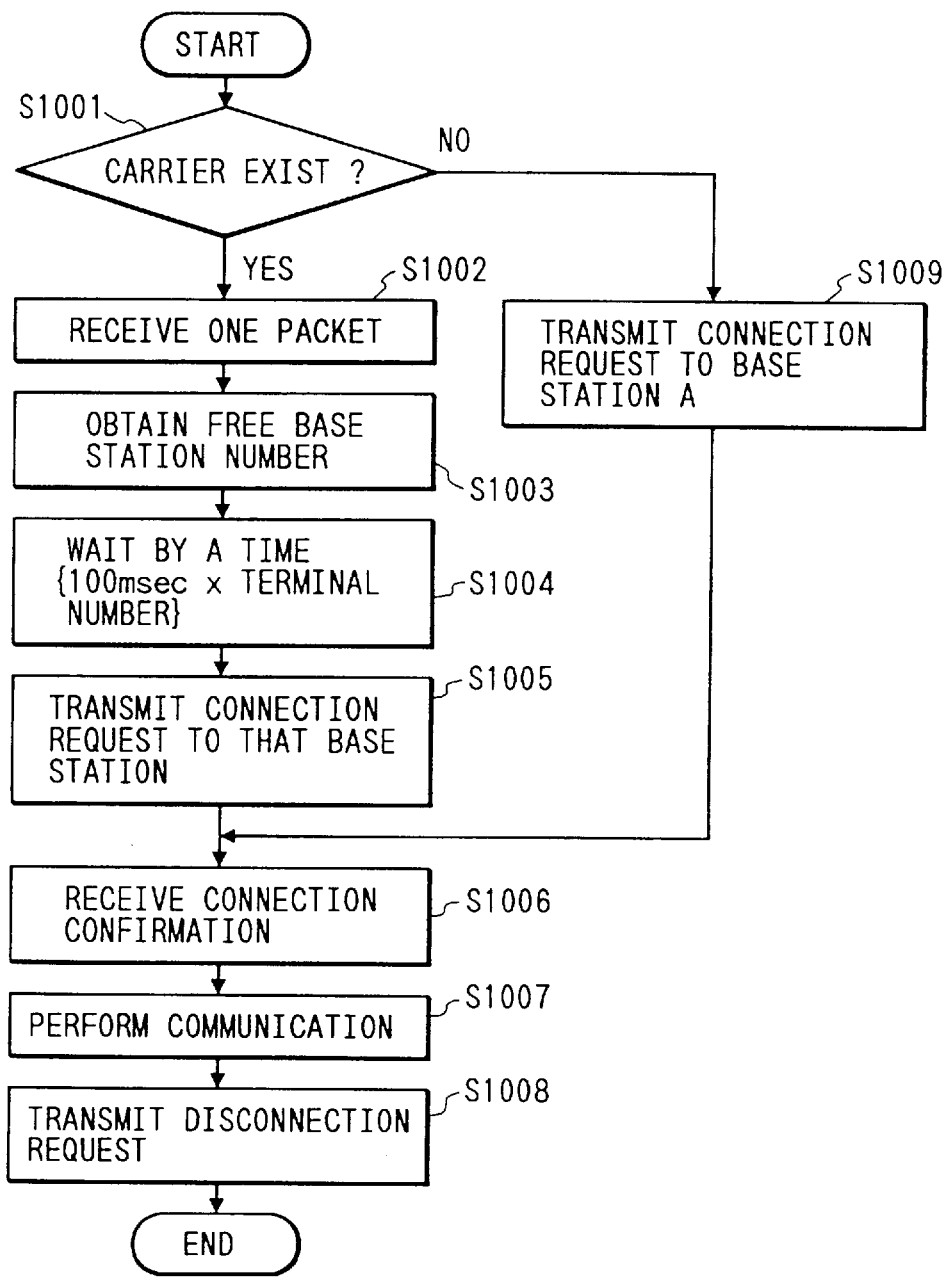
FIG. 26 is a flowchart showing an example of the operation of a terminal in the seventh embodiment of the invention.

In the seventh embodiment, the apparatus waits for only the time which is obtained by multiplying 100 msec to the base station number, thereby avoiding the mutual collision of a plurality of terminals. FIG. 26 is a flowchart showing the operation in such a case.

First, the free base station number is obtained in step S1003. In step S1004, the apparatus waits for only the time of $\{(100\ \text{msec}) \times (\text{terminal number})\}$. Since the other processes are similar to those in the fifth embodiment, their descriptions are omitted.

The eighth embodiment of the invention will now be described.

Figures 24, 27:
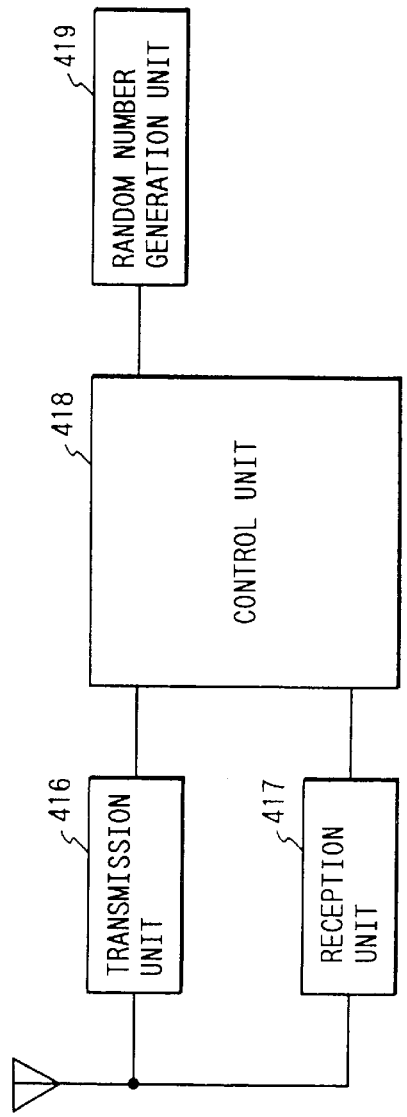
FIG. 24 is an explanatory diagram showing an RS unit communication packet format which is used in the fifth embodiment.
FIG. 27 is a block diagram showing a construction of a terminal in the eighth embodiment of the invention.

In case of the above seventh embodiment, the waiting time of the younger terminal number is certainly shorter. In the eighth embodiment, however, the waiting time is determined by the random number instead of the terminal number. As shown in FIG. 27, a random number generation unit 419 is newly provided for the terminal of the eighth embodiment. The other component elements are similar to those of the fifth embodiment (FIG. 18).

Figure 28:
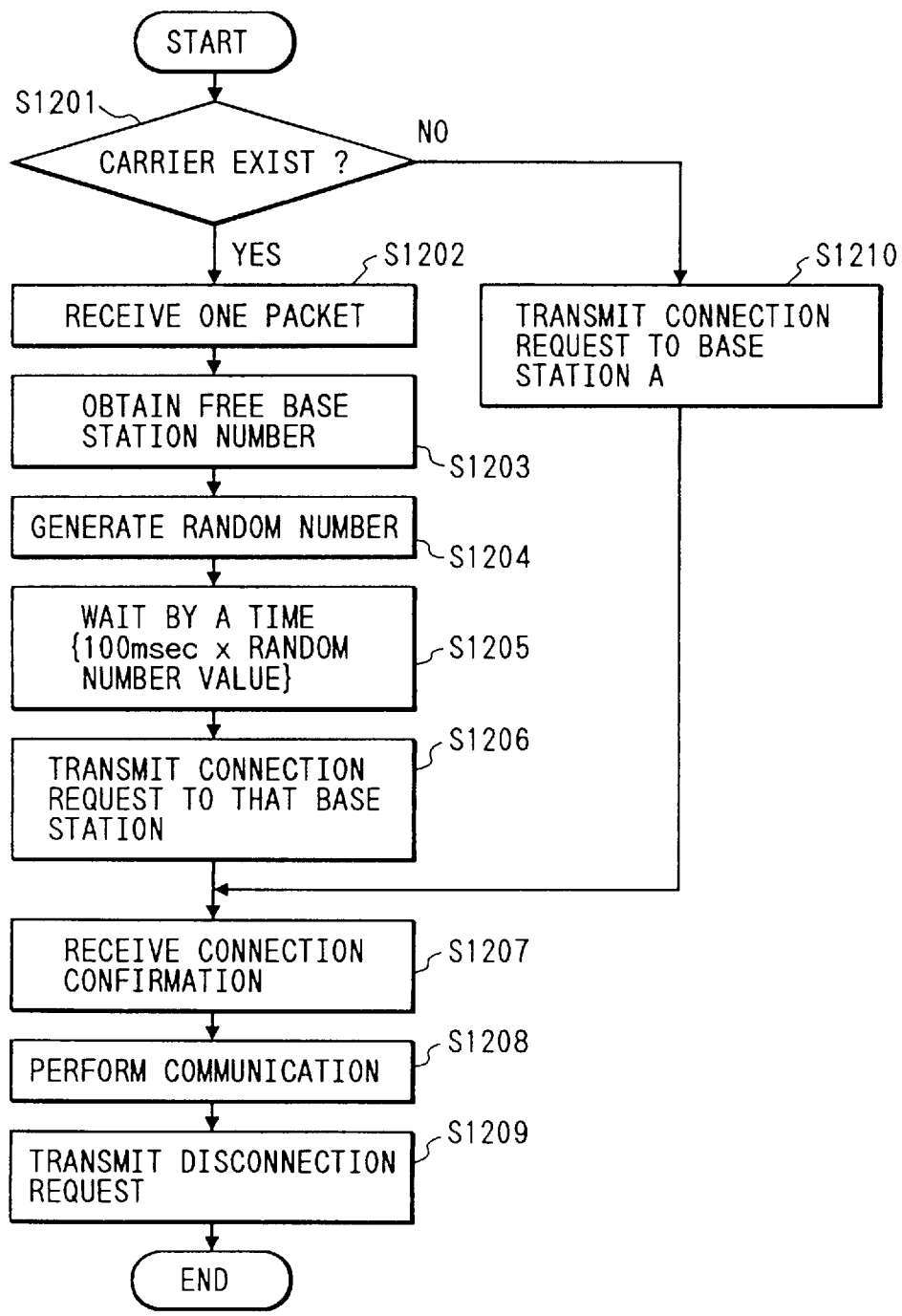
FIG. 28 is a flowchart showing an example of the operation of the terminal in the eighth embodiment.

The operation will now be described with reference to a flowchart of FIG. 28. After the free base station number was obtained in step S1203, a random number is generated in step S1204. In this case, by activating the random number generation unit 419, the numeral of one digit is obtained. In step S1205, $\{(100\ \text{msec}) \times (\text{random number value})\}$ is obtained and the apparatus waits for only such a time. The subsequent processes are similar to those in the seventh embodiment.

The ninth embodiment of the invention will now be described.

In the above fifth embodiment, one free base station number has been inserted into the packet. In the ninth embodiment, however, information indicating whether the base station is in connection or is free is inserted to all of the base stations. FIG. 29 shows an example of a bit pattern of such information. In this example, the case of eight base stations is shown. When the number of base stations further increases, it is sufficient to increase the number of bytes of the bit pattern.

Figure 30:
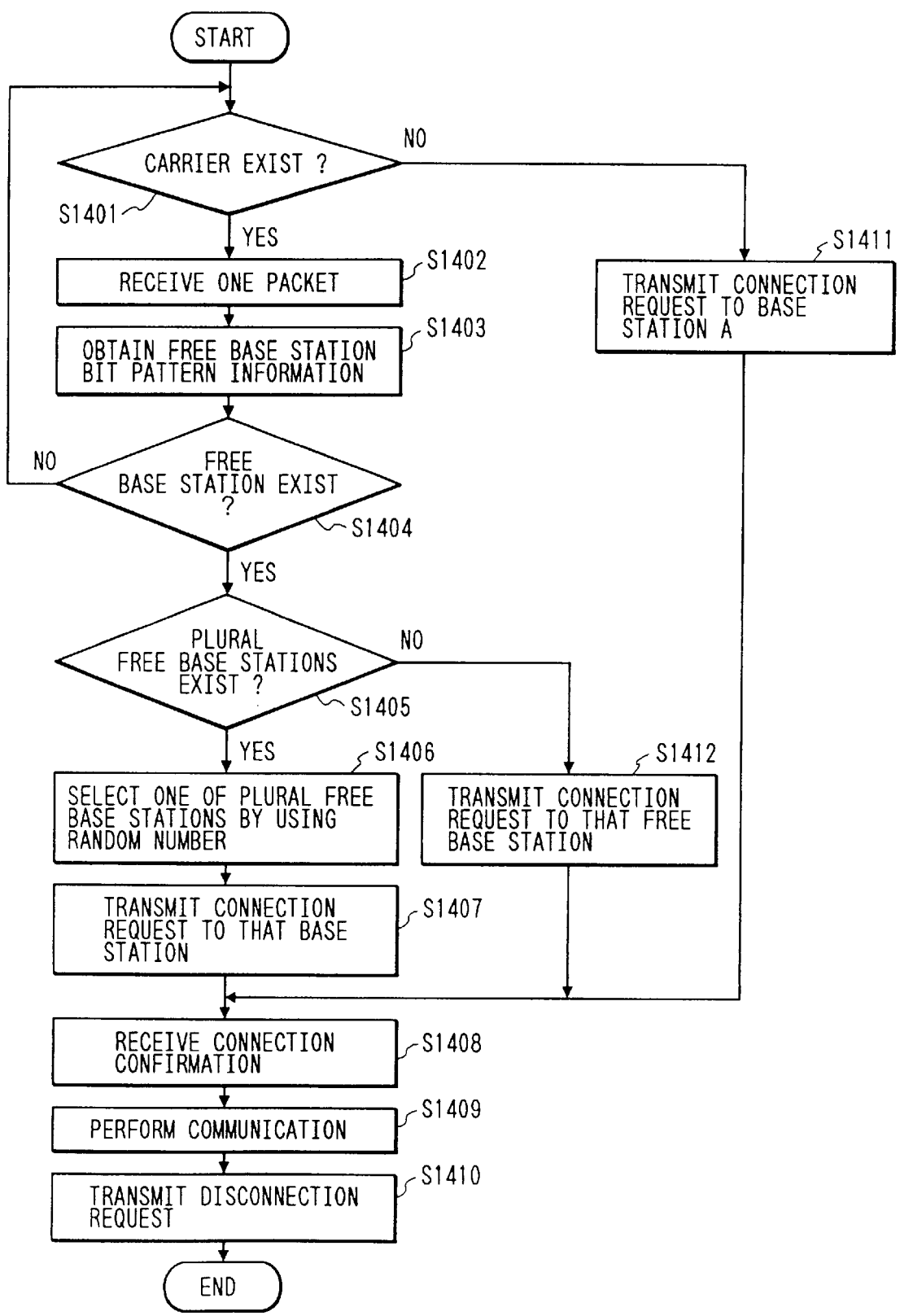
FIG. 30 is a flowchart showing an example of the operation of a terminal in the ninth embodiment.

The operation of the ninth embodiment will now be described with reference to a flowchart of FIG. 30. As shown in FIG. 27, the terminal has the random number generation unit 419.

In step S1403, free base station bit pattern information is obtained. In step S1404, a check is made to see if there is a free base station or not. If NO, the processing routine is returned to step S1401 and next one packet is received. The apparatus waits until a free base station is obtained.

When there is a free base station, step S1405 follows. A check is made to see if there are a plurality of free base stations or not. When there is only one free base station, in step S1412, the connection request is transmitted to the base station. When there are a plurality of free base stations, step S1406 follows and one of the plurality of free base stations is selected on the basis of the random number.

Figure 31:
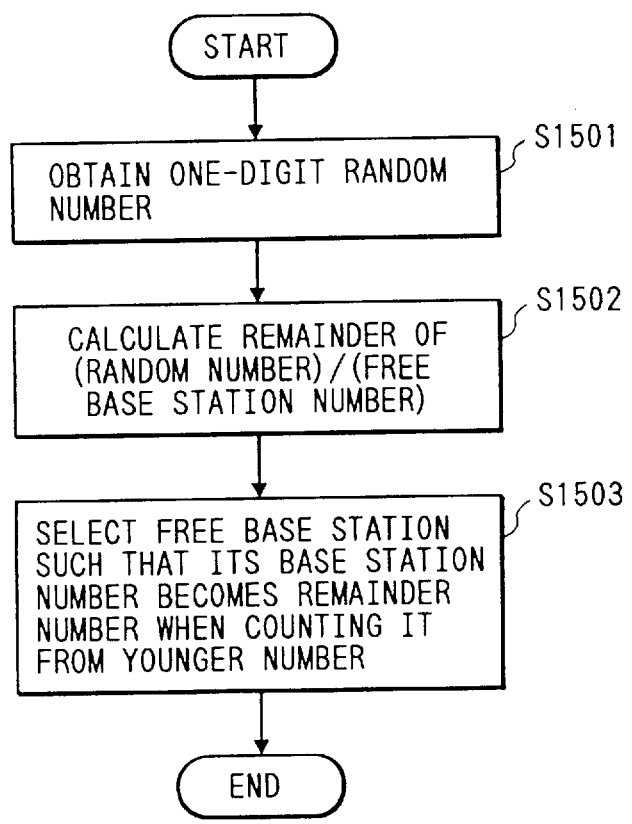
FIG. 31 is a flowchart showing the operation to select one free base station by a random number in FIG. 30.

As a selecting method, for example, a method as shown in a flowchart of FIG. 31 is used. First, the numeral of one digit is obtained by the random number generation unit 419 (S1501). The remainder in case of dividing the random number by the number of free base stations is calculated (S1502).

Further, the free base station is selected in a manner such that its base station number becomes the remainder number when it is counted from the younger base station number (S1503).

The reason why the free base station is selected by the random number as mentioned above is to prevent that the other terminal generates a connection request to the same base station.

Returning to FIG. 30, in step S1407, the connection request is transmitted to the selected base station. Since the contents other than the contents described above are similar to those in the fifth embodiment, their descriptions are omitted here.

The tenth embodiment of the invention will now be described.

According to the tenth embodiment, the self base station number is inserted into the area of the free base station number of FIG. 19. That is, the terminal receives the packets of all of the channels from which the carriers were generated and obtains the base station number before the connection request is transmitted. Since the base station number denotes that the base station is in use, the connection request is transmitted to the other base stations.

Figure 32:
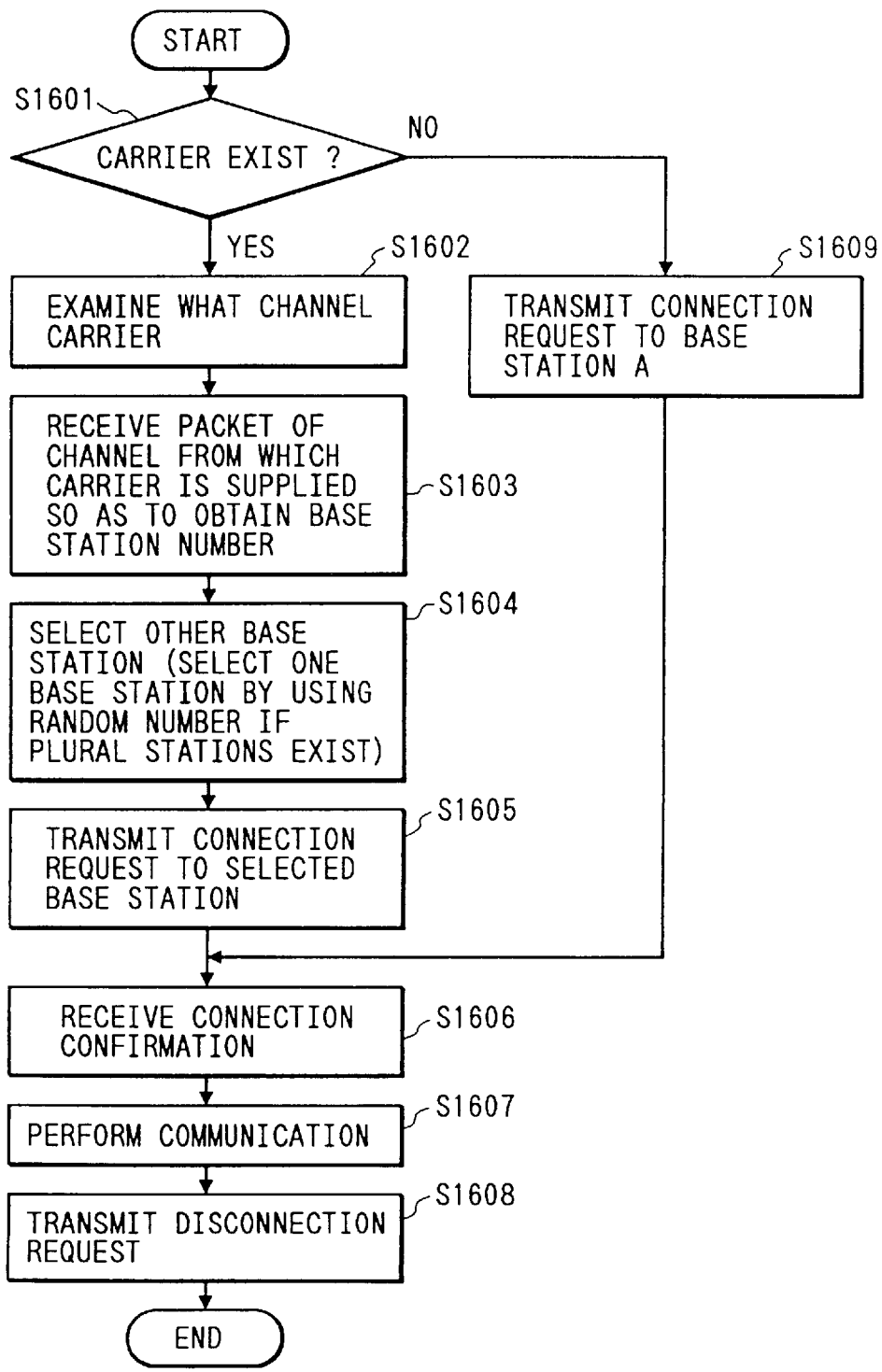
FIG. 32 is a flowchart showing an example of the operation of a terminal in the tenth embodiment of the invention.

FIG. 32 is a flowchart for explaining the operation.

First, in step S1601, the presence or absence of the carrier is examined. If there is a carrier, step S1602 follows and what channel carrier is examined. In step S1603, only one packet is received with respect to all of the channels from which the carriers are supplied. The inserted base station number is obtained.

In step S1604, since it is known that the base station obtained in step S1603 is in use, the other base station is selected. When there are a plurality of base stations, one of them is selected by the random number. The selecting method is substantially the same as that in the ninth embodiment.

In step S1605, the connection request is transmitted to the base station selected in step S1604. Since the contents other than the contents described above are similar to those in the fifth embodiment, their descriptions are omitted.

As a peculiar effect of the tenth embodiment, there is an advantage such that there is no need to manage the free base station in the host computer 201.

The eleventh embodiment of the invention will now be described.

According to the eleventh embodiment, when there is a carrier by a timer interrupting process when the base station is not in communication, the reception of the packet and the acquisition of the free base station number are executed before the connection request.

Due to this, in the case where there is a connection request by an application or the like, since the free base station number has previously been obtained, the connection request can be soon transmitted and the time which is required for connection can be reduced.

Figure 33:
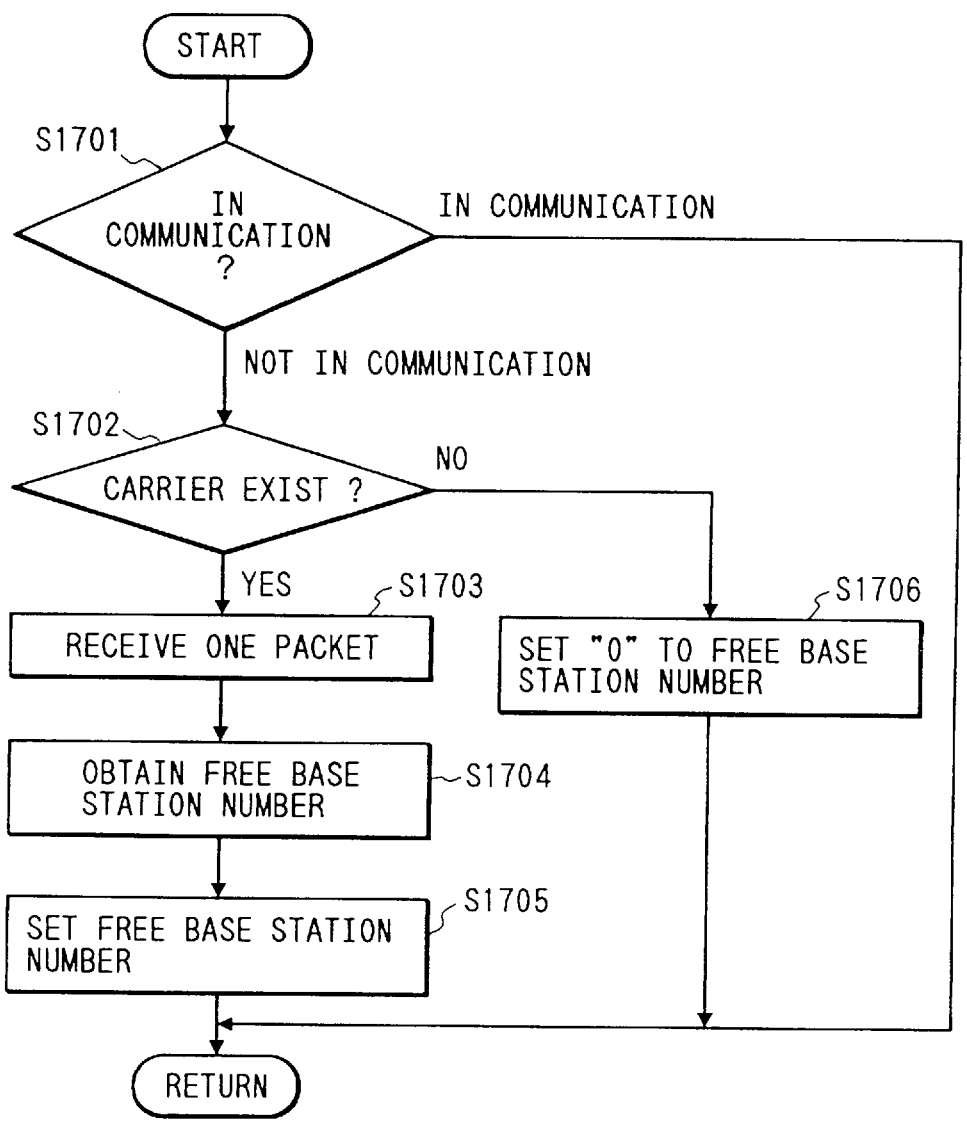
FIG. 33 is a flowchart showing an example of the operation for a timer interrupting process in the eleventh embodiment of the invention.
Figure 34:
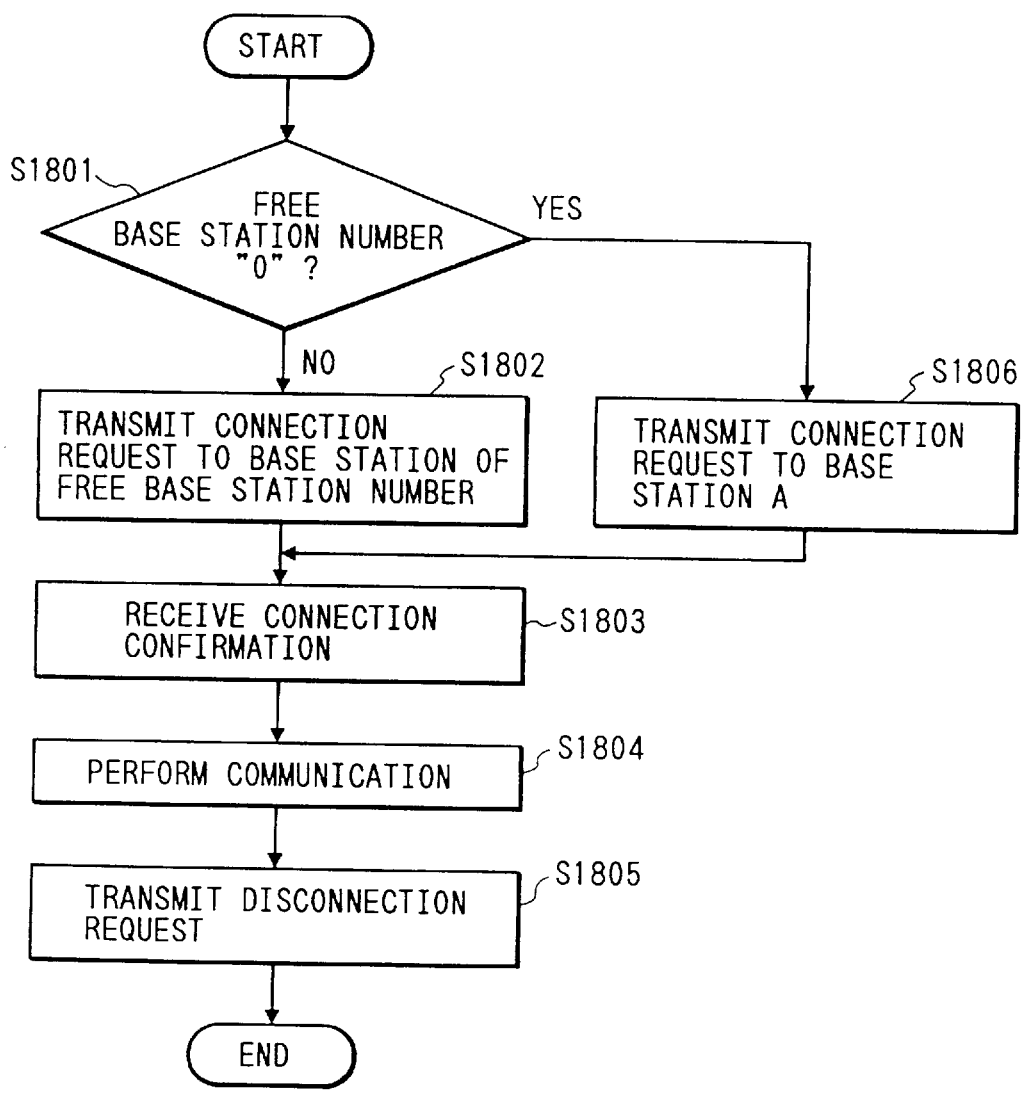
FIG. 34 is a flowchart showing an example of the operation of a terminal in the eleventh embodiment.

FIG. 33 is a flowchart showing the timer interrupting process in the eleventh embodiment. FIG. 34 is a flowchart showing the processes after the connection request was generated.

FIG. 33 will be first described. Since FIG. 33 relates to the timer interrupting process, it is periodically repetitively executed.

First, in step S1701, a check is made to see if the base station is in communication or not. When it is in communication, the timer interrupting process is not performed but the processing routine is returned. When the base station is not in communication, step S1702 follows and the presence or absence of the carrier is examined. When there is no carrier, step S1706 follows and the free base station number is set to "0". The processing routine is returned.

When there is a carrier, step S1703 follows and one packet is received and examined and the free base station is obtained (S1704). The free base station number is set into the free base station number in step S1705.

As a free base station number in this case, the number of the base station which is not at present in communication and which is waiting for the connection is set. When the connection is actually requested in FIG. 34, the connection request is transmitted to the base station of such a number. The processing routine is returned.

In FIG. 34, processes in the case where there is a connection request from an application or the like will now be described.

In step S1801, a check is first made to see if the free base station number is equal to "0" or not. If YES, step S1806 follows and the connection request is transmitted to the base station 301.

When the free base station number is not equal to "0", the connection request is transmitted to the base station of the free base station number (S1802). Since the other processes are similar to those in the fifth embodiment, their descriptions are omitted here.

Although the preferred embodiments of the present invention have been described above, the invention is not limited to the foregoing embodiments but many modifications and variations are possible within the spirit and scope of the appended claims of the invention.

What is claimed is:

1. A communication apparatus comprising:

memory means for storing communication obstacle information concerning a communication obstacle which occurred in times past and influences a communication to another communication apparatus;

receiving means for receiving information concerning the communication obstacle occurred in times past;

judging means for judging, on the basis of the information received by said receiving means, whether or not the communication obstacle information which coincides with the communication obstacle information stored in the another communication apparatus and concerning the communication obstacle occurred in times past has been stored in said memory means; and controlling means for controlling, according to the judgment by said judging means, said apparatus so as to delete the communication obstacle information stored in said memory means.

2. The apparatus according to claim 1, wherein, in a case where influence of the communication obstacle information was eliminated, said receiving means receives the information.

3. The apparatus according to claim 1, wherein said receiving means receives the information when the number of the communication obstacles stored in said memory means becomes larger than a predetermined number.

4. The apparatus according to claim 1, wherein the information received by said receiving means is the communication obstacle information stored in said another communication apparatus and concerning the communication obstacle.

5. The apparatus according to claim 1, further comprising transmitting means for transmitting the communication obstacle information stored in said memory means to said another communication apparatus, wherein said managing means processes the communication obstacle information based, wherein the information received by said receiving means represents a result of comparison between the communication obstacle information transmitted by said transmitting means and the communication obstacle information stored in said another communication apparatus.

6. The apparatus according to claim 1, wherein said another communication apparatus includes a base station.

7. The apparatus according to claim 1, wherein said receiving means receives the information concerning the communication obstacle, transmitted by a base station.

8. A communication apparatus comprising:

discriminating means for discriminating whether or not a communication channel is being used by communication between another communication apparatuses;

receiving means for receiving, when it is discriminated by said discriminating means that the used communication channel exists, data which is communicated by using the used communication channel and indicates a free communication apparatus;

judging means for judging the free communication apparatus on the basis of the data which has been received by said receiving means and indicates the free communication apparatus; and transmitting means for transmitting a connection request to a communication apparatus based on judgment by said judging means.

9. The apparatus according to claim 8, wherein the data indicating the free communication apparatus is included in all of packets to be transmitted from the communication apparatus.

10. The apparatus according to claim 8, wherein said transmitting means transmits the connection request to a free base station.

11. A first communication apparatus capable of communicating to a second communication apparatus by using a packet:

managing means for managing a communication state of another communication apparatus other than said first communication apparatus and said second communication apparatus; and transmitting means for adding information representing the communication state of the other communication apparatus to the packet to be transmitted to said second communication apparatus and then transmitting the packet added with the information, on the basis of the communication state of the other communication apparatus managed by said managing means.

12. An apparatus according to claim 11, wherein said communication apparatus is the communication apparatus including a base station.

13. An apparatus according to claim 11, wherein the information representing the communication state of another communication apparatus is the information representing whether or not the other communication apparatus is in communication.

14. An apparatus according to claim 11, wherein the information representing the communication state of the other communication apparatus is the information representing a free state of another communication apparatus.

15. An apparatus according to claim 14, wherein, in a case where the other communication apparatus is not in the free state, the information representing the communication state of the other communication apparatus is the information representing that the other communication apparatus is not in the free state.

16. An apparatus according to claim 14, wherein there are a plurality of the other communication apparatuses, and in a case where none of the plurality of the other communication apparatuses is in the free state, the information representing the communication state of the other communication apparatus is the information representing that there is no other communication apparatus being in the free state.

17. An apparatus according to claim 11, wherein there are a plurality of other communication apparatuses, and the information representing the communication state of the other communication apparatus is the information concerning the plurality of the other communication apparatuses.

18. An apparatus according to claim 17, wherein the information representing the communication state of the other communication apparatus is the information representing whether or not each of the plurality of the other communication apparatuses is in communication.

19. An apparatus according to claim 17, wherein the information representing the communication state of the other communication apparatus is the information representing the free state of each of the plurality of the other communication apparatuses.

20. A second communication apparatus capable of communicating to a first communication apparatus by using a packet, comprising:

receiving means for receiving the packet which was transmitted from said first communication apparatus and is added with information representing a communication state of another communication apparatus other then said first communication apparatus and said second communication apparatus;

analyzing means for analyzing the packet received by said receiving means;

judging means for judging the communication state of the other communication apparatus based on the analysis by said analyzing means; and communicating means for communicating to the other communication apparatus based on the judgment by said judging means.

21. An apparatus according to claim 20, wherein said first communication apparatus is the communication apparatus including a base station.

22. An apparatus according to claim 20, wherein there are a plurality of other communication apparatuses, and the information which was added to the packet transmitted from said first communication apparatus and represents the communication state of the other communication apparatus is the information concerning the plurality of the other communication apparatuses.

23. An apparatus according to claim 22, wherein the information which was added to the packet transmitted from said first communication apparatus and represents the communication state of the other communication apparatus is the information representing whether or not each of the plurality of the other communication apparatuses is in communication.

24. An apparatus according to claim 22, wherein the information was added to the packet transmitted from said fist communication apparatus and represents the communication state of the other communication apparatus is the information representing a free state of each of the plurality of the other communication apparatuses.

25. An apparatus according to claim 24, wherein said judging means judges whether or not the other communication apparatus is in the free state, and said communicating means performs the communication to the communication apparatus in the plurality of the other communication apparatuses which apparatus has been judged to be in the free state.

26. An apparatus according to claim 25, wherein the judgment by said judging means is performed when the communication is started by said communication means.

27. An apparatus according to claim 25, wherein the judgment by said judging means is periodically performed, and said communicating means starts the communication based on the judgment periodically performed by said judging means.

28. A method for controlling a communication apparatus, comprising:

a storage step of storing, in a memory, communication obstacle information concerning communication obstacle which affects communication to another communication apparatus and had occurred in past time;

a receiving step of receiving the information concerning the communication obstacle occurred in past time;

a judging step of judging whether or not the communication obstacle information coincident with communication obstacle information stored in the other communication apparatus and concerning communication obstacle occurred in past time has been stored in the memory, based on the information received in said receiving step; and a deletion step of deleting the communication obstacle information stored in the memory, according to the judgment in said judging step.

29. A method according to claim 28, wherein said receiving step receives the information when influence of the communication obstacle on the communication was recovered and thus the communication becomes possible.

30. A method according to claim 28, wherein said receiving step receives the information when the number of communication obstacles stored in the memory becomes larger than a predetermined number.

31. A method according to claim 28, wherein the information received in said receiving step is the communication obstacle information stored in the other communication apparatus and concerning the communication obstacle.

32. A method according to claim 28, further comprising a transmitting step of transmitting the communication obstacle information stored in the memory to the other communication apparatus, and wherein the information received in said receiving step is obtained as a result of comparing the communication obstacle information transmitted in said transmitting step and the communication obstacle information stored in the other communication apparatus.

33. A method according to claim 28, wherein the other communication apparatus includes a base station.

34. A method for controlling a communication apparatus comprising:

a discriminating step of discriminating whether or not there is a communication channel being used in communication between other communication apparatuses;

a receiving step of receiving, when it is discriminated in said discriminating step that there is the communication channel being used, data which is in communication by using the used communication channel and represents a free communication apparatus;

a judging step of judging the free communication apparatus based on the data received in said receiving step and representing the free communication apparatus; and a transmitting step of transmitting a connection request to a communication apparatus based on judgment in said judging step.

35. A method according to claim 34, wherein the data representing the free communication apparatus is included in a packet transmitted from the communication apparatus.

36. A method according to claim 34, wherein said transmitting step transmits the connection request to a free base station.

37. A method for controlling a first communication apparatus capable of communicating to a second communication apparatus by using a packet, comprising:

a managing step of managing a communication state of another communication apparatus other than the first communication apparatus and the second communication apparatus; and a transmitting step of adding information representing the communication state of the other communication apparatus to the packet to be transmitted to the second communication apparatus and then transmitting the packet added with the information, on the basis of the communication state of the other communication apparatus managed in said managing step.

38. A method according to claim 37, wherein the first communication apparatus is the communication apparatus including a base station.

39. A method according to claim 37, wherein the information representing the communication state of the other communication apparatus is the information representing whether or not the other communication apparatus is in communication.

40. A method according to claim 37, wherein the information representing the communication state of the other communication apparatus is the information representing a free state of the other communication apparatus.

41. A method according to claim 40, wherein, in a case where the other communication apparatus is not in the free state, the information representing the communication state of the other communication apparatus is the information representing that the other communication apparatus is not in the free state.

42. A method according to claim 40, wherein there are a plurality of the other communication apparatuses, and in a case where none of the plurality of the other communication apparatuses is in the free state, the information representing the communication state of the other communication apparatus is the information representing that there is no other communication apparatus being in the free state.

43. A method according to claim 37, wherein there are a plurality of the other communication apparatuses, and the information representing the communication state of the other communication apparatus is the information concerning the plurality of the other communication apparatuses.

44. A method according to claim 43, wherein the information representing the communication state of the other communication apparatus is the information representing whether or not each of the plurality of the other communication apparatuses is in communication.

45. A method according to claim 43, wherein the information representing the communication state of the other communication apparatus is the information representing the free state of each of the plurality of the other communication apparatuses.

46. A method for controlling a second communication apparatus capable of communicating to a first communication apparatus by using a packet, comprising:

a receiving step of receiving the packet which was transmitted from the first communication apparatus and is added with information representing a communication state of another communication apparatus other than the first communication apparatus and the second communication apparatus;

an analyzing step of analyzing the packet received in said receiving step;

a judging step of judging the communication state of the other communication apparatus based on the analysis in said analyzing step; and a communicating step of communicating to the other communication apparatus based on the judgment in said judging step.

47. A method according to claim 46, wherein the first communication apparatus is the communication apparatus including a base station.

48. A method according to claim 46, wherein there are a plurality of the other communication apparatuses, and the information which was added to the packet transmitted from the first communication apparatus and represents the communication state of the other communication apparatus is the information concerning the plurality of the other communication apparatuses.

49. A method according to claim 48, wherein the information which was added to the packet transmitted from the first communication apparatus and represents the communication state of the other communication apparatus is the information representing whether or not each of the plurality of the other communication apparatuses is in communication.

50. A method according to claim 48, wherein the information which was added to the packet transmitted from the first communication apparatus and represents a communication state of the other communication apparatus is the information representing a free state of each of the plurality of the other communication apparatuses.

51. A method according to claim 50, wherein said judging step judges whether or not the other communication apparatus is in the free state, and said communicating step performs the communication to the communication apparatus in the plurality of the other communication apparatuses which apparatus has been judged to be in the free state.

52. A method according to claim 51, wherein the judgment in said judging step is performed when the communication is started in said communication step.

53. A method according to claim 51, wherein the judgment in said judging step is periodically performed, and said communicating step starts the communication based on the judgment periodically performed in said judging step.

* * * * *